Figure 1:
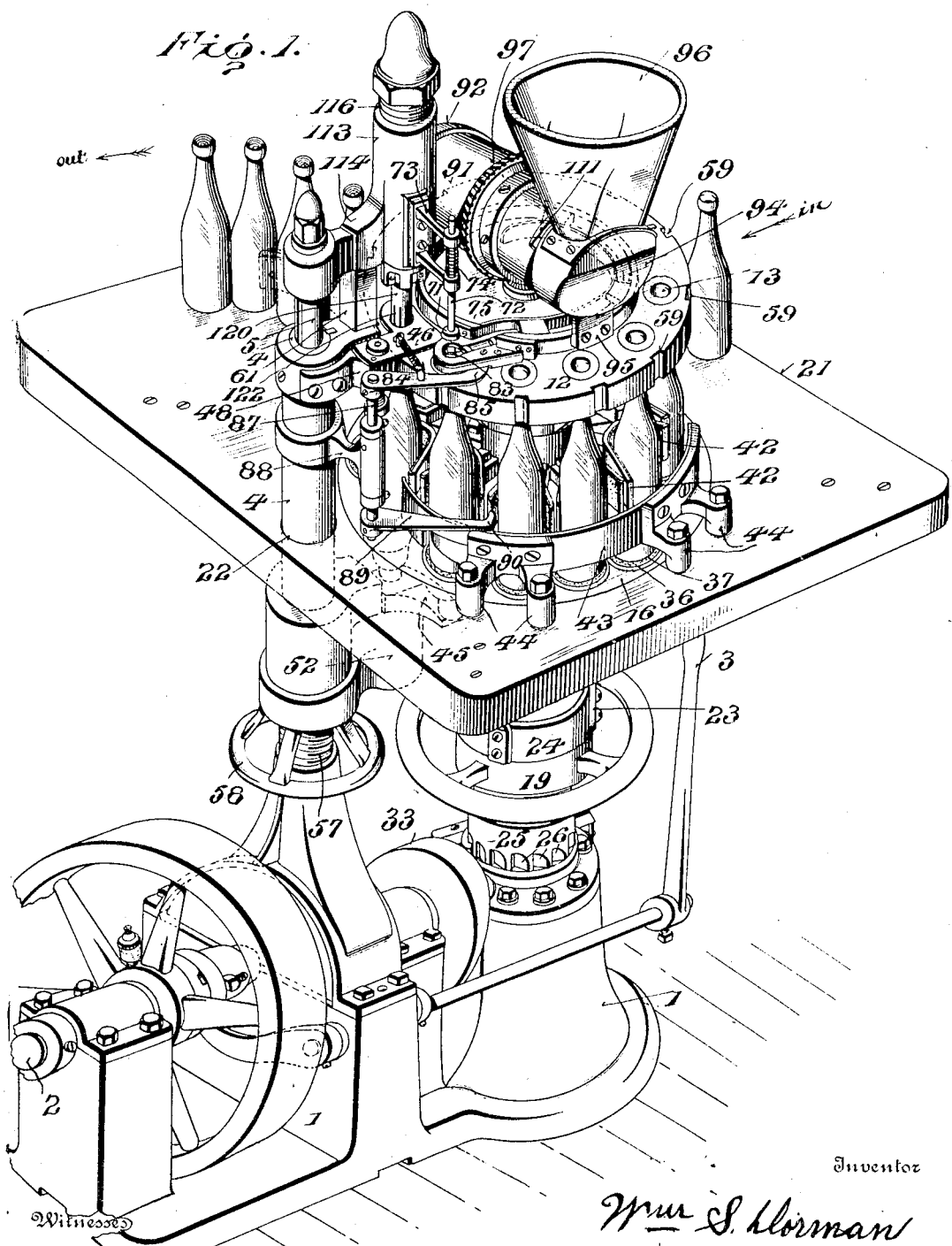

W. S. DORMAN.
BOTTLE STOPPERING MACHINE.
APPLICATION FILED MAR. 9, 1907. RENEWED DEC. 11, 1907.

904,763.

Patented Nov. 24, 1908.

13 SHEETS—SHEET 1.

Witnesses
W. A. Williams
A. H. Bennett

Inventor
Wm. S. Dorman
By Herbert Weck
Attorney

W. S. DORMAN.
BOTTLE STOPPERING MACHINE.
APPLICATION FILED MAR. 9, 1907. RENEWED DEC. 11, 1907.

904,763.

Patented Nov. 24, 1908.
13 SHEETS—SHEET 2.

Witnesses
W. A. Williams
A. H. Emmett

Inventor
Wm. S. Dorman
By Hubert E. Peck
Attorney

W. S. DORMAN.
BOTTLE STOPPERING MACHINE.
APPLICATION FILED MAR. 9, 1907. RENEWED DEC. 11, 1907.

904,763.

Patented Nov. 24, 1908.
13 SHEETS—SHEET 3.

Witnesses
W. A. Williams
A. F. Kunst

Inventor
Wm. S. Dorman
By Herbert A. Beck
Attorney

W. S. DORMAN.
BOTTLE STOPPERING MACHINE.
APPLICATION FILED MAR. 9, 1907. RENEWED DEC. 11, 1907.

904,763.

Patented Nov. 24, 1908.
13 SHEETS—SHEET 4.

W. S. DORMAN.
BOTTLE STOPPERING MACHINE.
APPLICATION FILED MAR. 9, 1907. RENEWED DEC. 11, 1907.

904,763.

Patented Nov. 24, 1908.
13 SHEETS—SHEET 5.

Witnesses
W. A. Williams

Inventor
Wm. S. Dorman
By Hubert S. Peak
Attorney

W. S. DORMAN.
BOTTLE STOPPERING MACHINE.
APPLICATION FILED MAR. 9, 1907. RENEWED DEC. 11, 1907.

904,763.

Patented Nov. 24, 1908.
13 SHEETS—SHEET 6.

Witnesses
W. A. Williams
L. F. Emmett

Inventor
Wm. S. Dorman
by Hubert Howson
Attorney

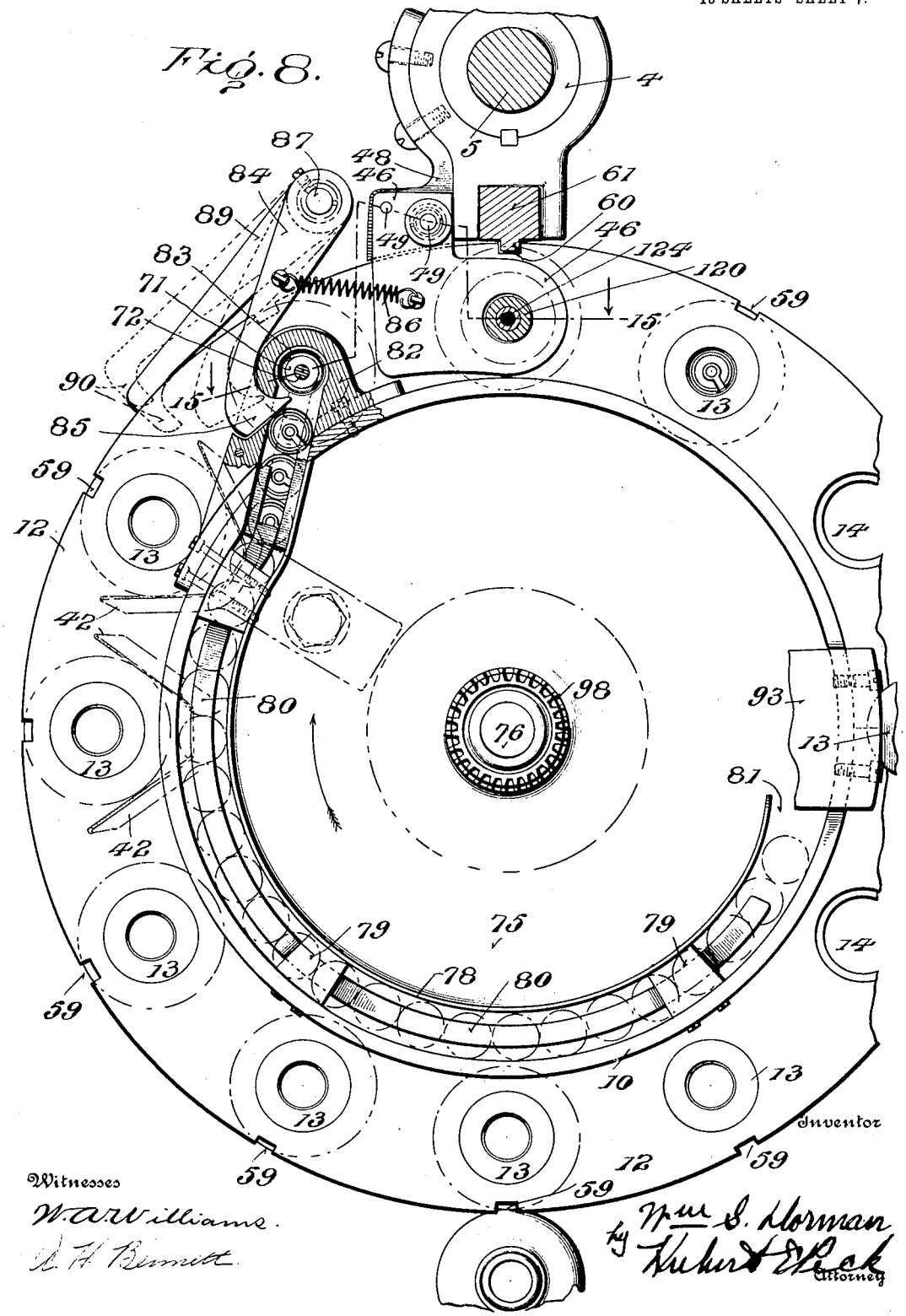

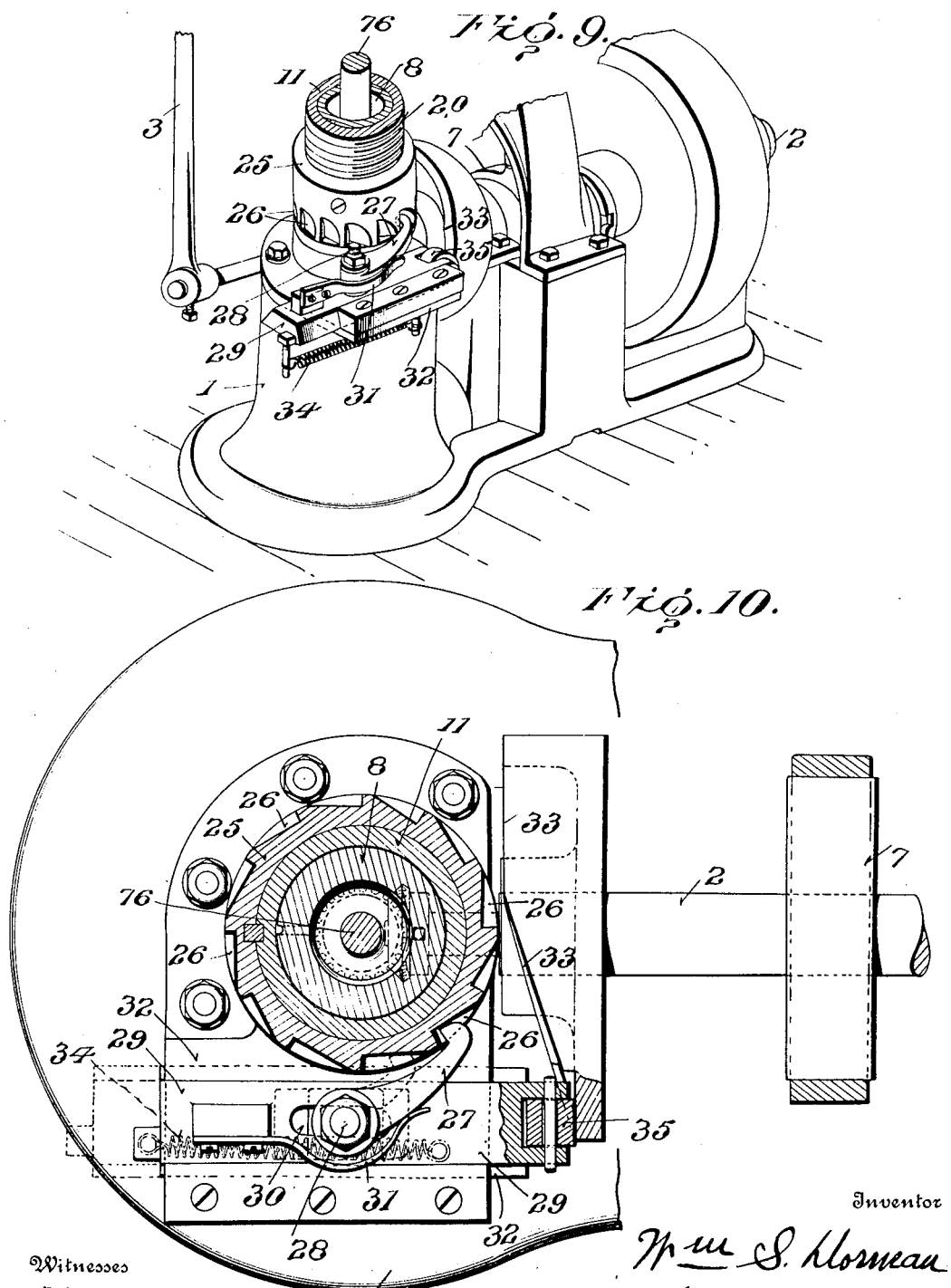

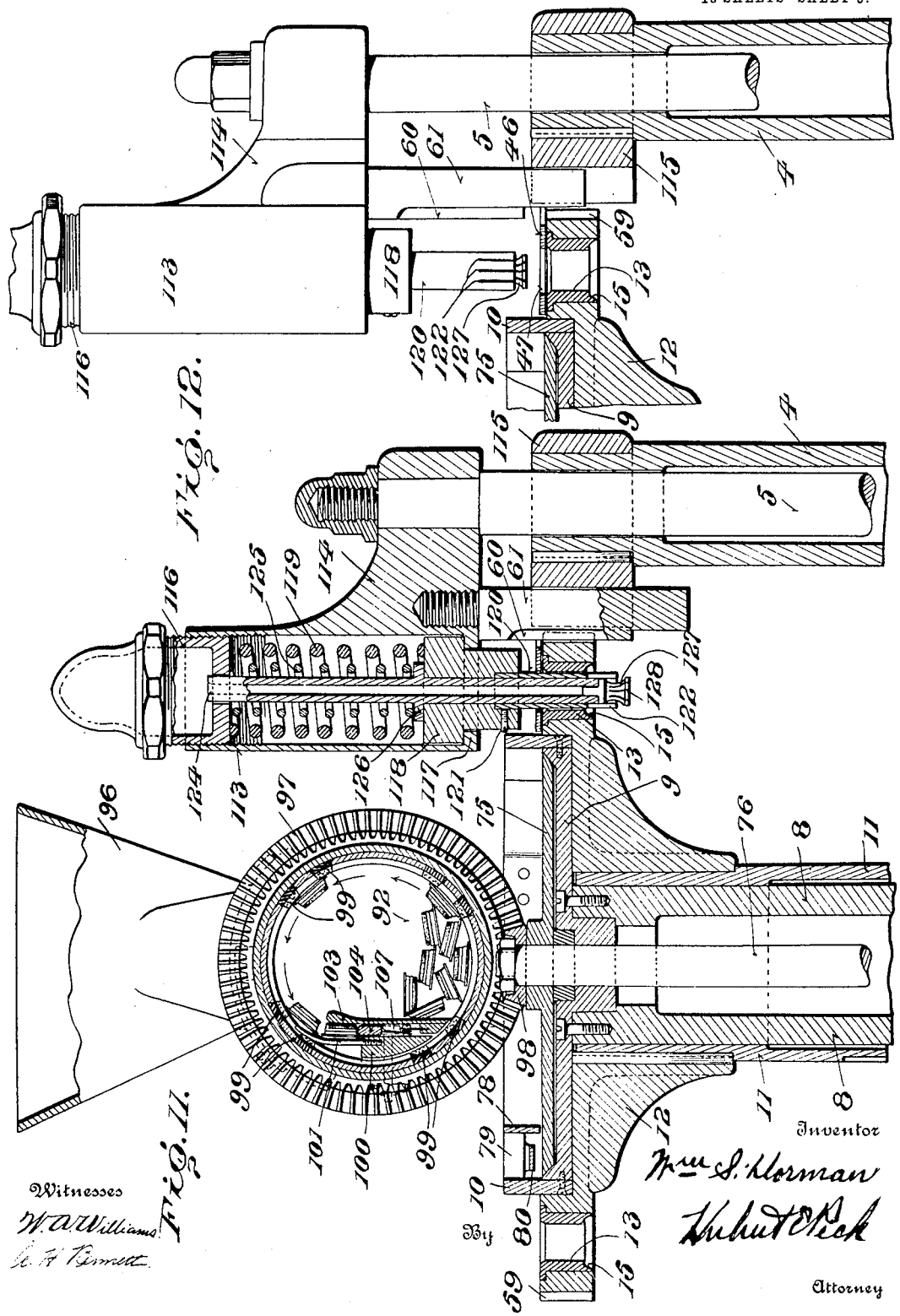

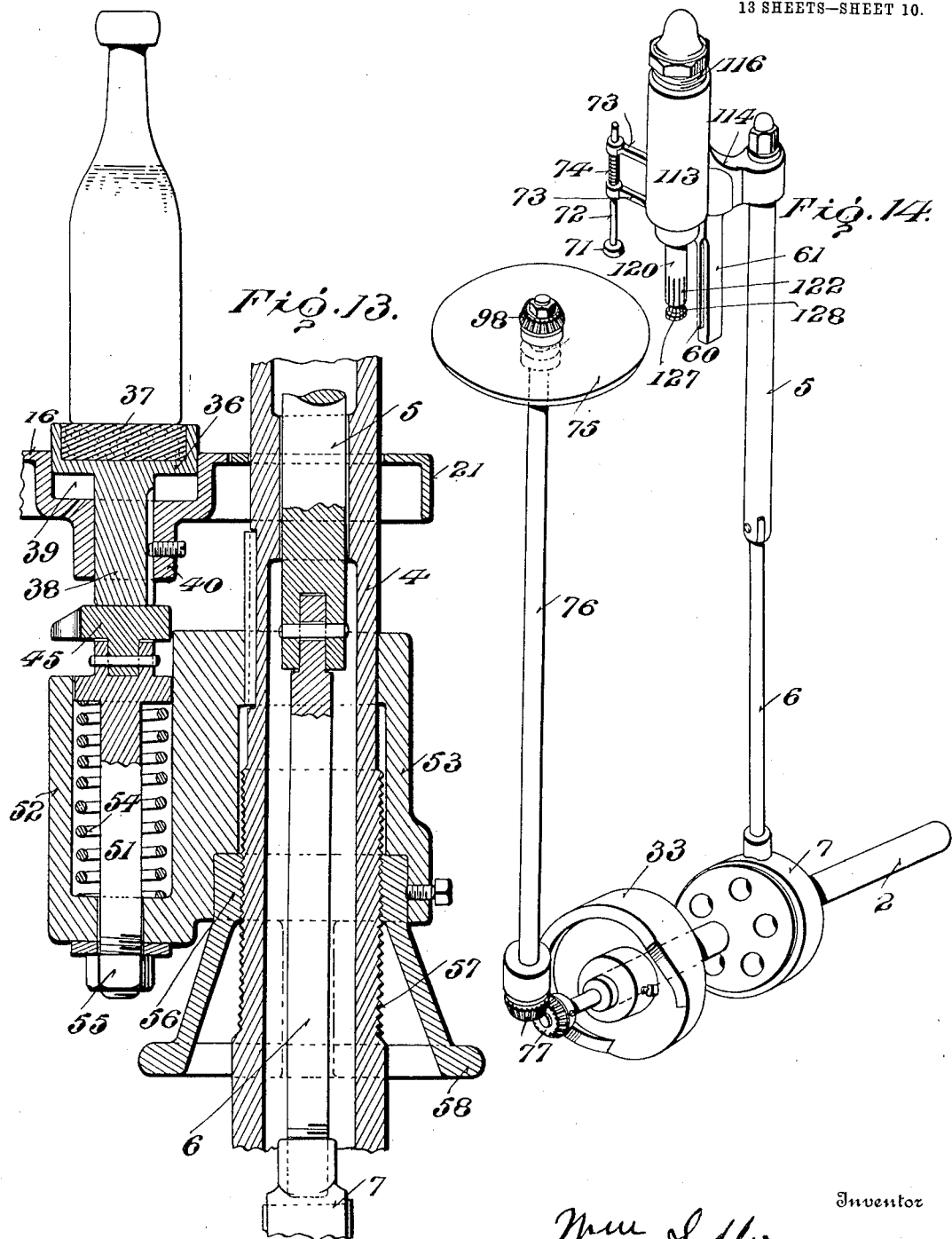

W. S. DORMAN.
BOTTLE STOPPERING MACHINE.
APPLICATION FILED MAR. 9, 1907. RENEWED DEC. 11, 1907.
904,763.
Patented Nov. 24, 1908.
13 SHEETS—SHEET 11.
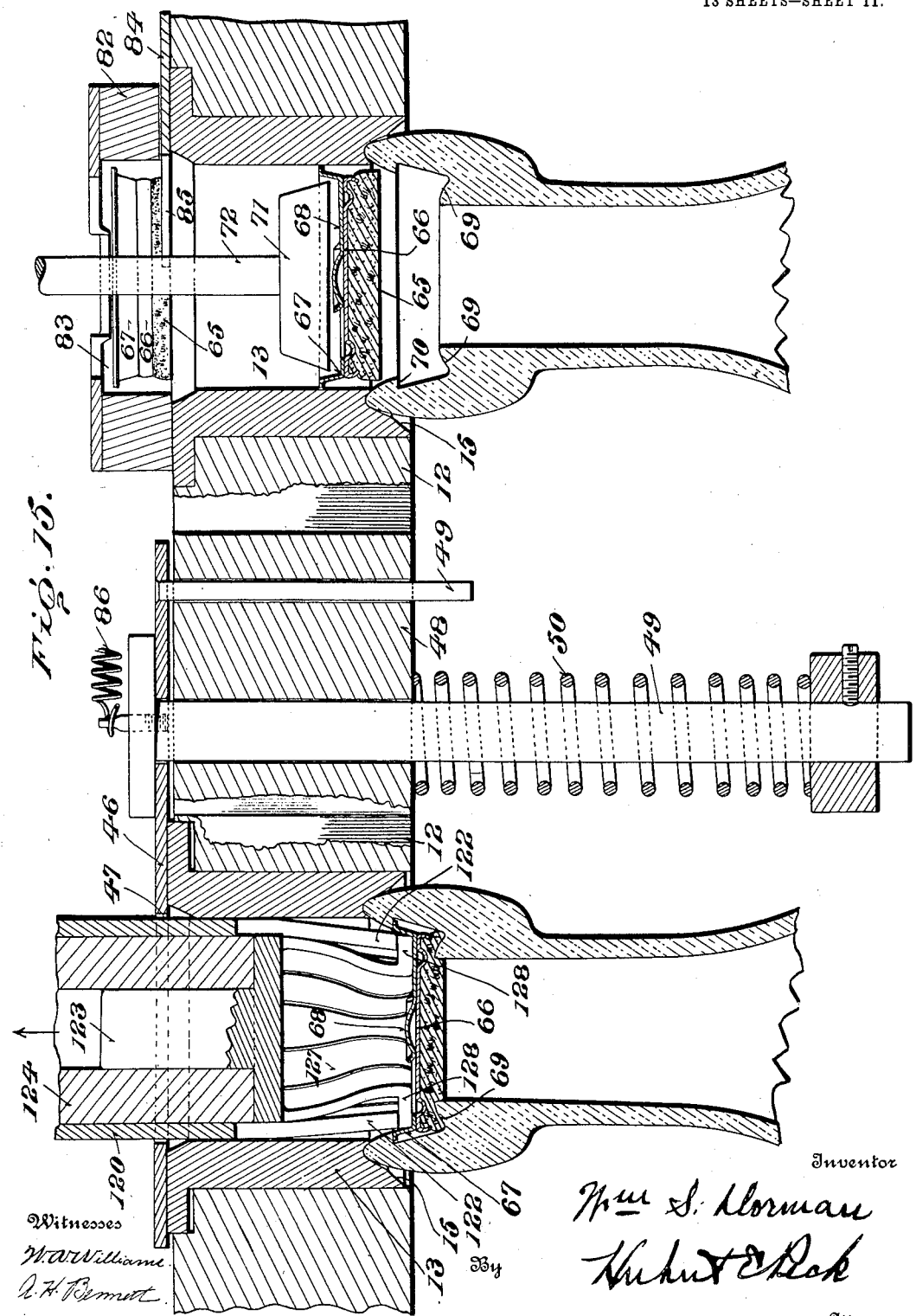

W. S. DORMAN.
BOTTLE STOPPERING MACHINE.
APPLICATION FILED MAR. 9, 1907. RENEWED DEC. 11, 1907.
904,763.
Patented Nov. 24, 1908.
13 SHEETS—SHEET 12.
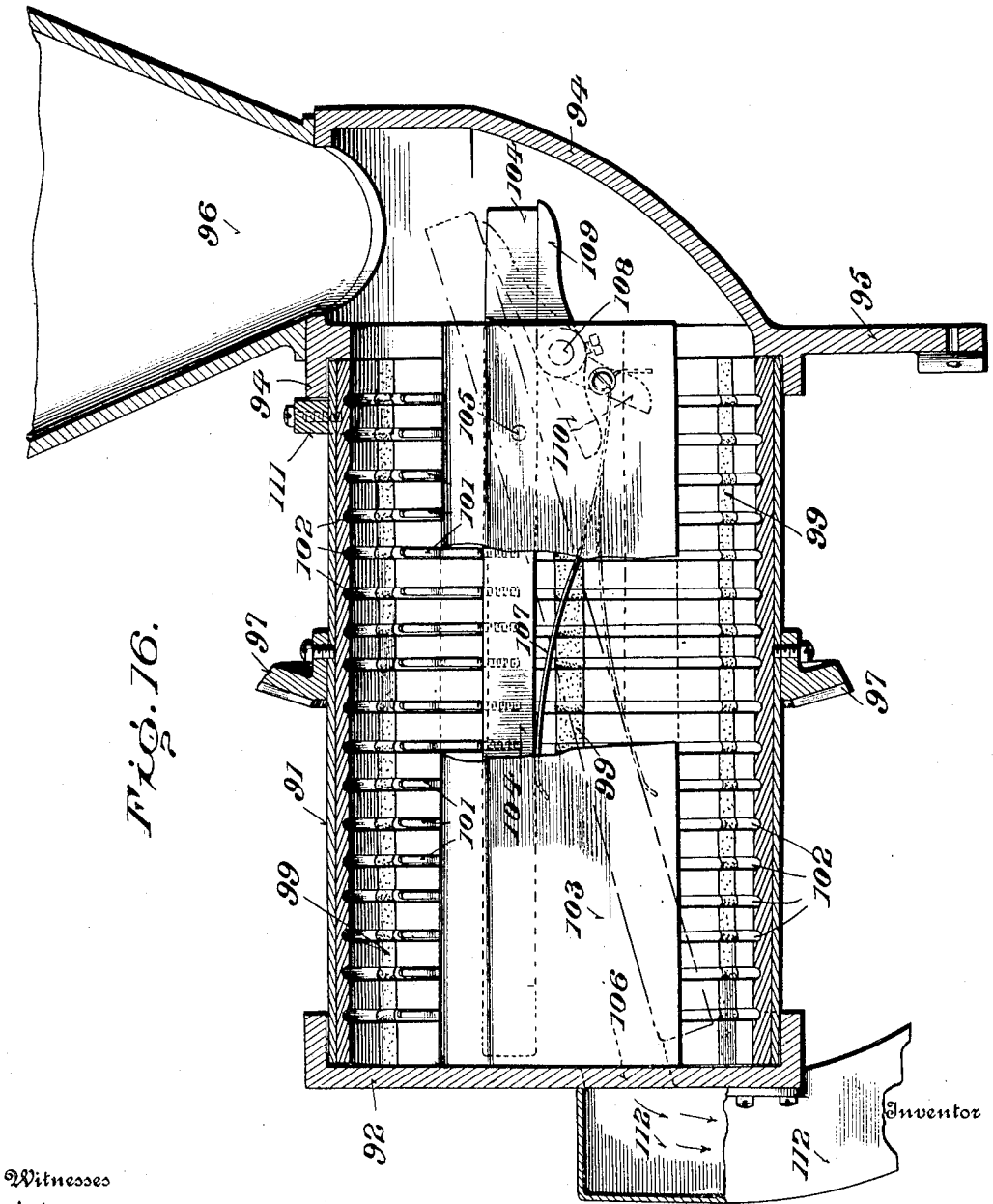

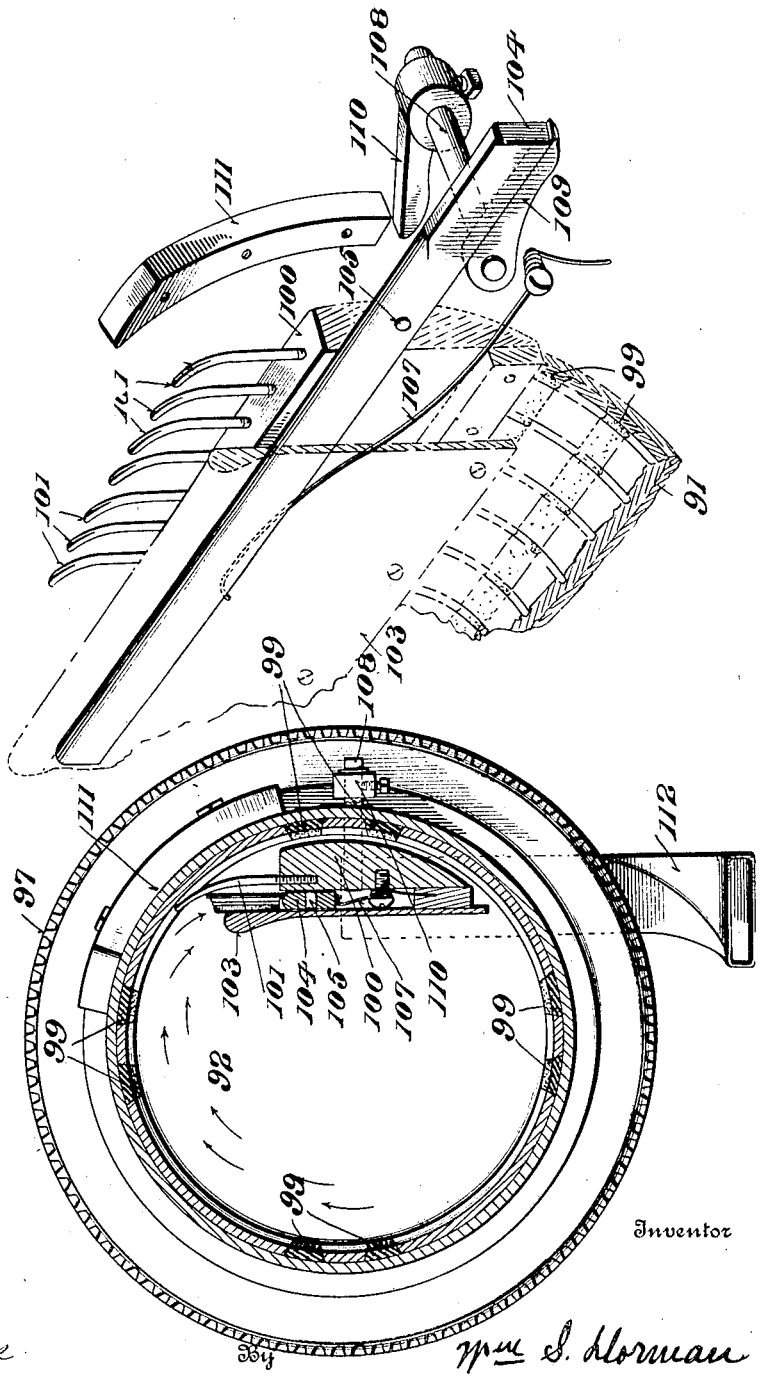

UNITED STATES PATENT OFFICE.

WILLIAM SAMUEL DORMAN, OF BROOKLYN, NEW YORK, ASSIGNOR TO SPRING SEAL COMPANY, OF AUGUSTA, MAINE, A CORPORATION OF MAINE.

BOTTLE-STOPPERING MACHINE.

No. 904,763.  Specification of Letters Patent.  Patented Nov. 24, 1908.

Application filed March 9, 1907, Serial No. 361,610.  Renewed December 11, 1907.  Serial No. 406,049.

*To all whom it may concern:*

Be it known that I, WILLIAM SAMUEL DORMAN, a citizen of the United States, residing at Brooklyn, Kings county, State of New York, have invented certain new and useful Improvements in Bottle-Stoppering Machines; and I do hereby declare the following to be a full, clear, and exact description of the invention, such as will enable others skilled in the art to which it appertains to make and use the same.

This invention relates to certain improvements in bottle stoppering or sealing machines; and the objects and nature of my invention will be readily understood by those skilled in the art in the light of the following description of the embodiments shown in the accompanying drawings of what I now consider the preferred forms from among other constructions within the spirit and scope of my invention.

The invention consists in certain novel features in construction, in combinations and in arrangements of parts as more fully and particularly set forth and explained hereinafter.

Figure 2:
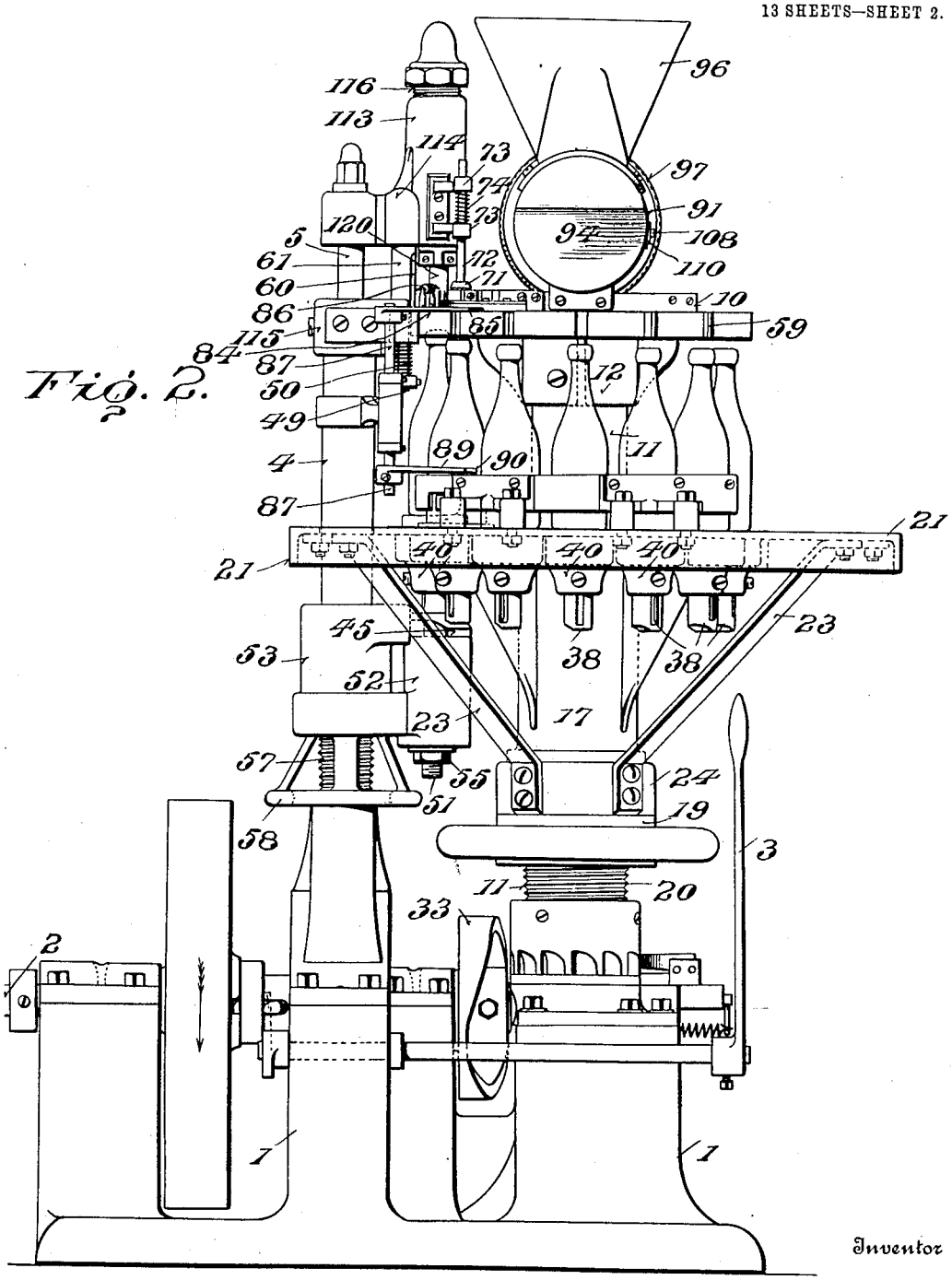
Figure 3:
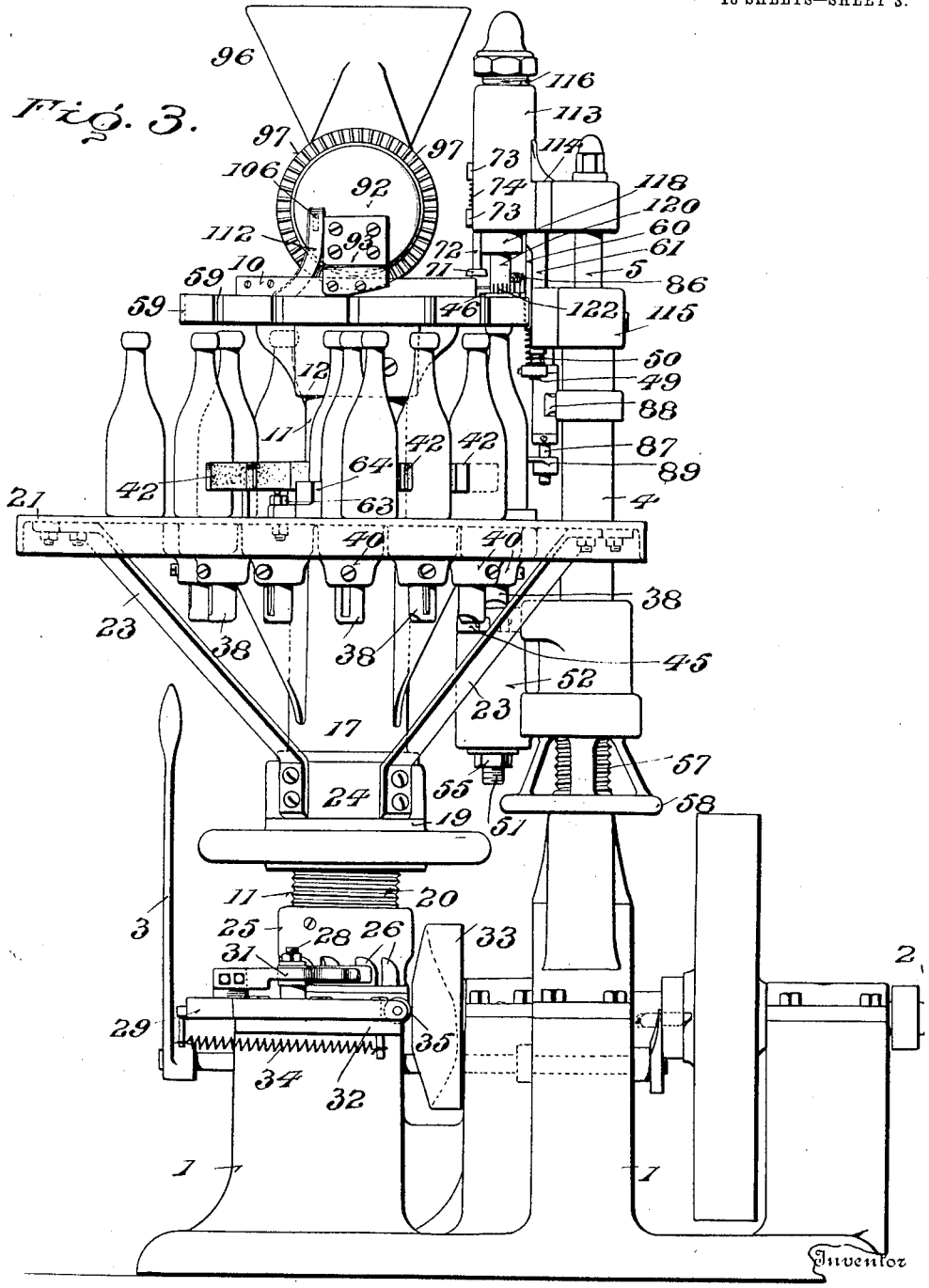
Figure 4:
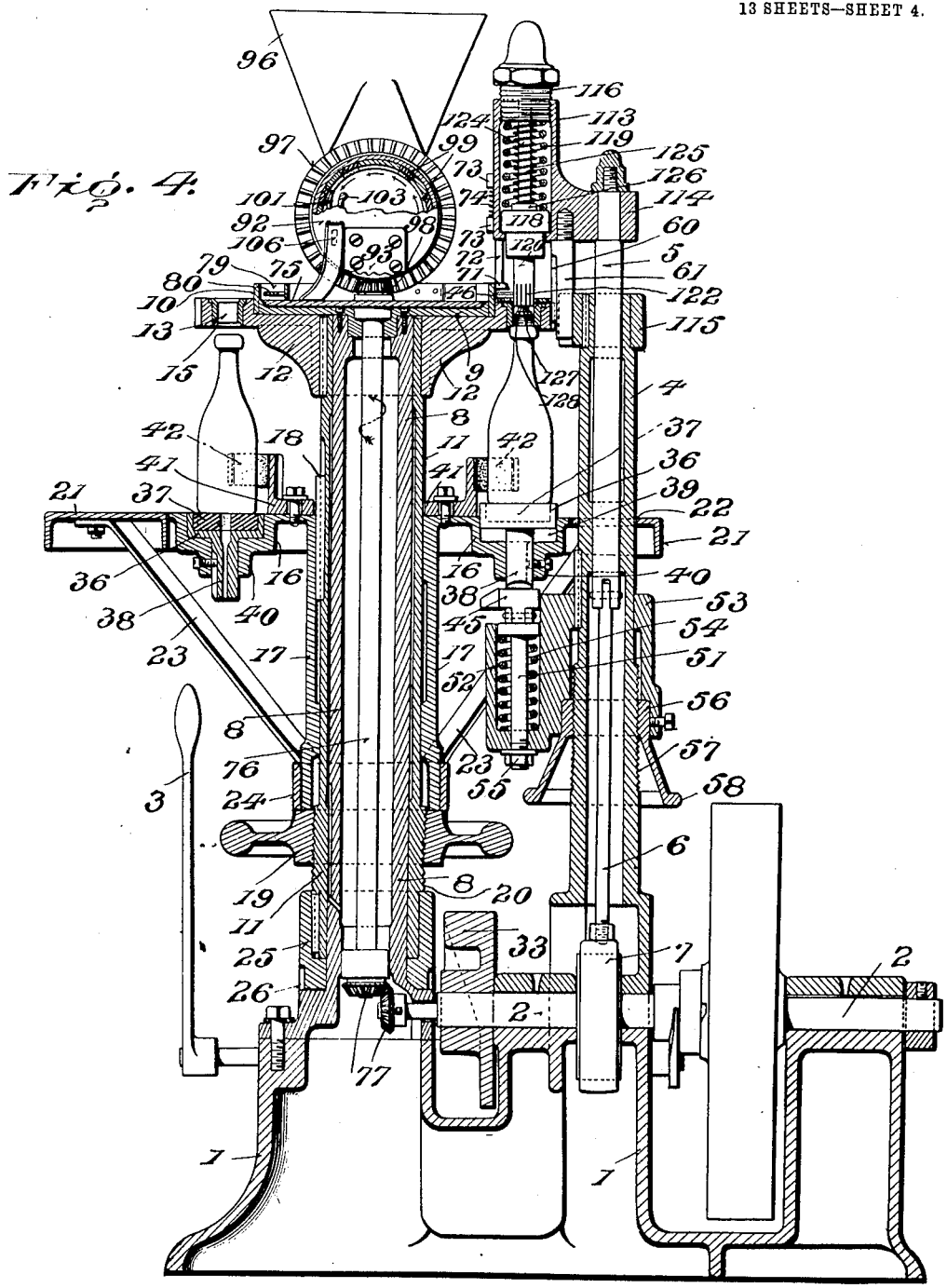
Figure 5:
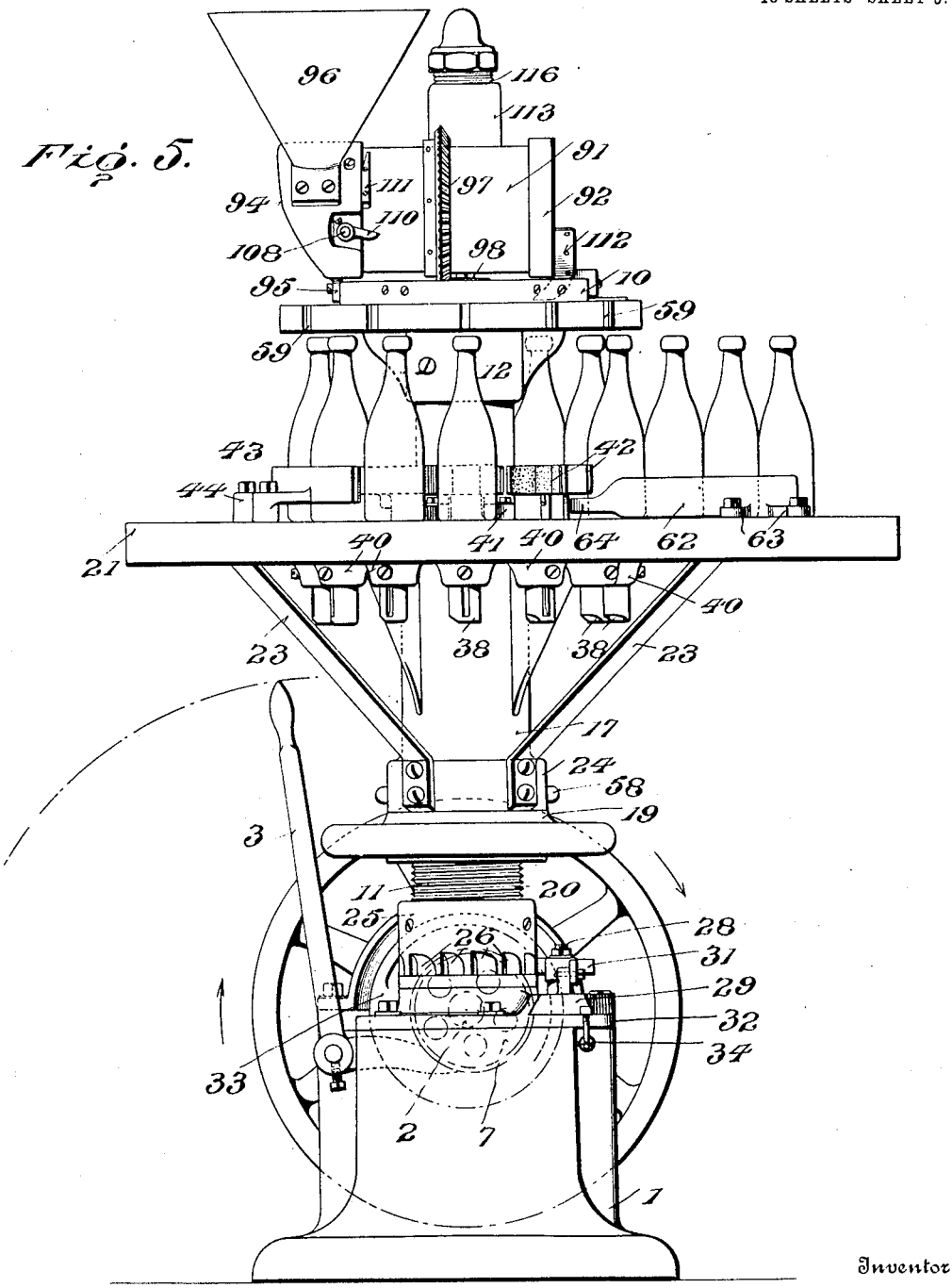
Figure 6:
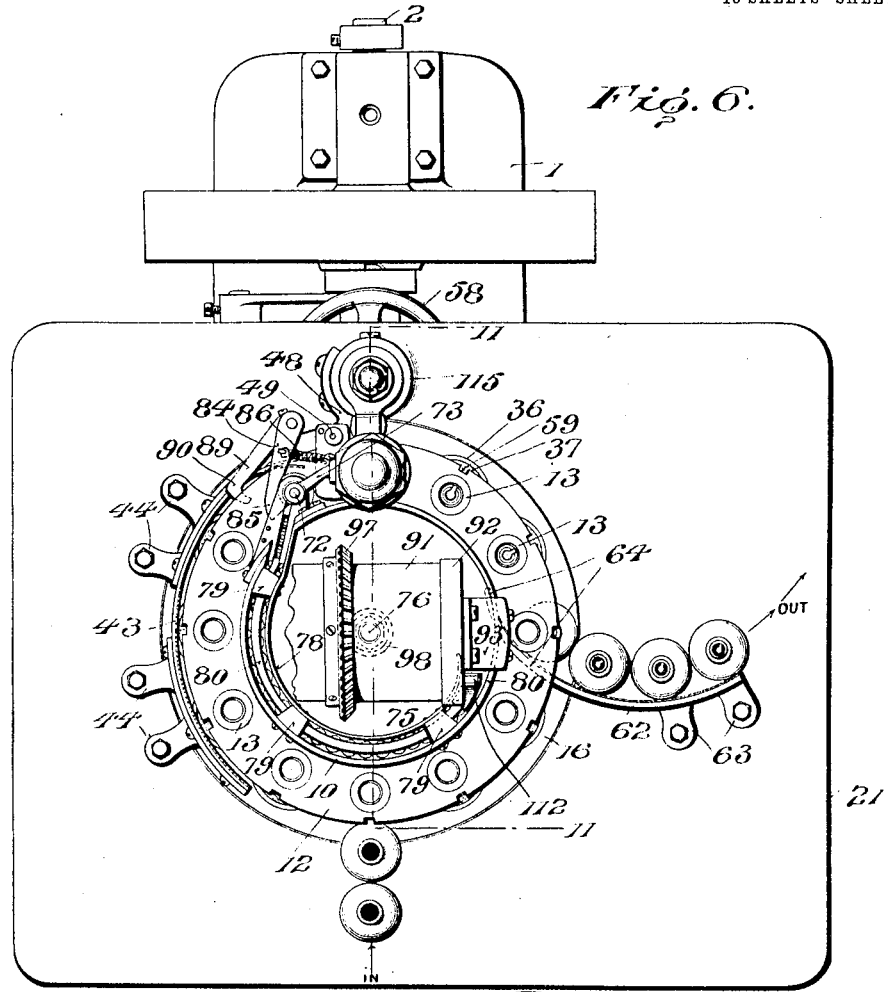
Figure 7:
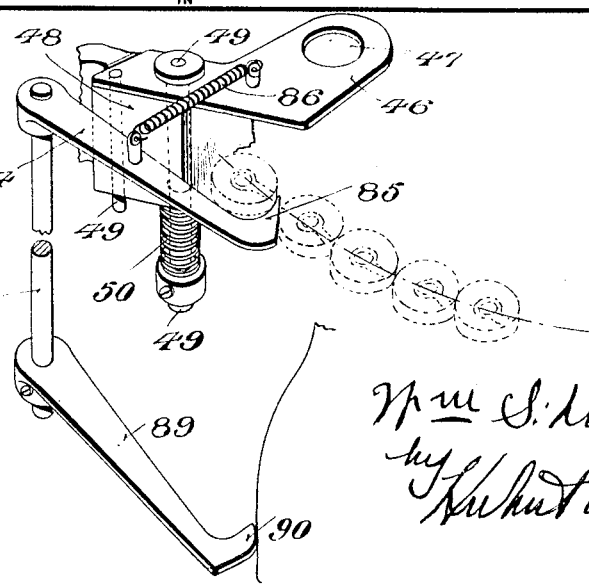

Referring to the accompanying drawings:—Figure 1, is a perspective view of the machine. Figs. 2 and 3, are side elevations, taken from opposite sides. Fig. 4, is a central vertical section. Fig. 5, is a front elevation. Fig. 6, is a top plan, a portion of the stopper supplying and selecting cylinder being broken away to show certain parts below the same. Fig. 7, is a detail perspective view of the bottle operated stop motion or controlling gate for the stoppers, and also showing the yielding stop for the bottle mouth centering sleeves or stopper guides, dotted lines indicating a row of stoppers held back by said gate and one stopper which has been allowed to pass the gate. Fig. 8, is a top plan view, portions being removed, shown in cross section, and broken away, showing the rotary stopper feed disk and the stopper stop motion, and the rotary head or disk carrying the bottle mouth centering and stopper guiding or delivering sleeves or rings. Fig. 9, is a detail perspective of the driving mechanism for imparting the step by step motion to the bottle carrying devices and parts rotating therewith, parts being broken away. Fig. 10, is a sectional plan of the ratchet mechanism of Fig. 9. Fig. 11, is a vertical sectional view taken in the plane of the line 11—11, Fig. 6. Fig. 12, is a detail sectional elevation showing the reciprocating head and its plungers in side elevation and in normal elevated position, portions of adjacent parts being shown in vertical section. Fig. 13, is a detail vertical section showing the means for lifting each bottle just before it arrives at the sealing or stopper applying point or station. Fig. 14, is a detail perspective showing the main drive shaft, the rotary stopper feeding disk, the reciprocating stopper applying head, and the actuating connections for said parts. Fig. 15, is a detail vertical section, on an exaggerated scale, through the rotary disk or head carrying the bottle mouth centering and stopper guides, showing two adjacent guides and the mouth portions of bottles fitting the same, one guide being at the stopper receiving point and the other guide at the bottle sealing point, the plunger for forcing the stoppers into the guides being shown, and also the heads or plungers for forcing the stoppers into and compressing the same in the bottle mouths, said section being taken in the plane 15—15, Fig. 8, looking in direction of arrow. Fig. 16, is a longitudinal section through the stopper feeding and selecting cylinder or box, some parts being broken away. Fig. 17, is a cross section through the rotary cylinder or box of Fig. 16, arrows indicating the direction of movement of the cylinder and the stoppers lifted by the magnets, a stopper being shown in the passage way from the cylinder and resting on the tilting gate or floor. Fig. 18, is a detail perspective view showing some of the stripping fingers for directing the properly positioned stoppers into the passage way arranged longitudinally within the rotating cylinder, a portion of the cylinder and passage-way being shown by dotted lines, the tilting floor or gate and its controlling devices being shown by full lines.

In the particular example illustrated, a step by step or intermittingly rotated bottle feed table or carrier is arranged in an opening in a non-rotary work platform. The open bottles are placed by hand or otherwise on the bottle holders of the feed table, which table successively carries the bottles to the sealing point or position and remains at rest while each bottle is being sealed and which successively discharges the sealed bottles onto said work platform. This feed table carries a series of equally spaced vertically movable bottle holders or supports, one for each bottle, and these holders normally rest on the table in lowered position but, as each bottle approaches the sealing position, the holder thereof engages a yieldingly-held cam which elevates the holder and its bottle thereby pressing the bottle mouth into or against the lower end of a yieldingly held bottle mouth socket or centering device and stopper guide into which a stopper has been delivered and through which the stopper compressing and seating plunger projects to force the stopper into and compress the same in the bottle mouth. The stoppering plunger is then withdrawn, and the table moves a step to withdraw the sealed bottle and permit its holder to drop, with the bottle, to normal position.

The bottle mouth and stopper guides are arranged above and spaced to correspond with the bottle holders and are carried by a rotary head or disk moving in unison with the bottle feeding table.

The sealing head carrying the stopper applying plunger is timed to operate in proper sequence with the bottle feed table and the stopper-supplying-devices, and said head also operates a plunger for forcing a stopper into each stopper-and-bottle-mouth guide as it arrives at the stopper receiving position, the parts being usually arranged to force a stopper into each guide just before said guide is moved to the sealing position, and about when the yieldingly upheld cam starts the bottle holder on its upward course to press its mouth into said holder receiving the stopper.

A horizontally disposed stopper feed or guideway leads to the stopper receiving position for the stopper guides and has a vertical opening adapted to register with each stopper guide as it passes beneath said opening, and the said stopper delivering plunger, at each stop of the bottle, passes down through said vertical opening and into the stopper guide registering therewith, to force a stopper into said guide. The stoppers in said feed or guideway rest on the top surface of a constantly and rapidly rotating horizontal disk and are thereby constantly pressed forward in said guide-way toward said vertical discharge opening thereof, and means are provided to normally hold back the stoppers from said vertical opening, said means being controlled by the passage of bottles, whereby no stopper will be permitted to enter said opening for discharge into a stopper guide unless a bottle is arranged under the guide to receive the stopper from the guide. If a bottle is arranged beneath said guide, the bottle as it moves toward the stopper receiving position will operate said means to permit one stopper to pass forward into said vertical opening. The stoppers might be placed by hand, proper side up, on the top face of said rapidly rotating feed disk, and centrifugal action would throw the stoppers toward the circumference of the disk and cause the stoppers to properly enter and crowd forward in a row in the guide or feed way. I prefer, however, to employ a stopper selecting or positioning device into which a mass or quantity of the stoppers can be thrown promiscuously and which will feed the stoppers properly positioned, onto said feed disk for carrying forward to the stopper guides.

In the drawings, 1, is a suitably constructed base, in which the horizontal main or drive shaft 2, is arranged. This shaft can be driven by any suitable means, although I usually provide any suitable clutch mechanism, controlled by any desirable means, such as hand lever 3, for throwing the main shaft 2, into and out of gear with its driving gear.

4, is a hollow vertical post or column rigid with and rising from the base and carrying the means supporting the bottle-holder-elevating cam, and the means carrying and reciprocating the sealing head. The sealing head is fixed to the upper end of a slide rod 5, working in and projecting above the post 4, and at its lower end pivotally joined to the upper end of a link or pitman 6, from eccentric 7, on the drive shaft 2, and by which the sealing head is reciprocated. The eccentric and operative connections therefrom to the sealing head are arranged to impart a sealing stroke, that is one complete reciprocation, to the sealing head on each complete revolution of the main shaft 2.

8, is a hollow rigid vertical column or post fixed to and rising from the front end of the base, and spaced the proper distance from the post 4.

9, is a stationary horizontal plate or platform fixed on the upper end of stationary column 8; and 10, is a vertical ring or annular wall fixed to the edge of plate 9, and rising vertically therefrom.

A rotary sleeve 11, is arranged on the column 8, with running fit, preferably extending from a step bearing at the lower end of the column to the fixed plate or head 9, on the upper end of the column. On the upper end of this rotary sleeve, is keyed or otherwise fixed, the horizontal disk or circular head 12, which carries the series of bottle mouth and stopper guides or throats 13. This disk 12, is of greater diameter than the fixed plate 9, and the top of the disk is concentrically recessed to receive said fixed plate. Outwardly beyond said fixed plate, the rotary disk is formed with the annular series of uniformly spaced vertical openings 14, each opening extending completely through the disk between the periphery and recessed portion thereof. Each opening, if desired, can be countersunk at its upper end, to receive the annular exterior top supporting flange of its vertically movable throat or guide 13, so that the top edges of the guides will usually be about flush with the top face of the carrying disk. Each opening 14, receives a guide 13, which fits loosely therein and extends therethrough, and is in the form of a sleeve or socket having the upper end of its bore slightly beveled or flared outwardly, while the lower edge of the sleeve is recessed or beveled at 15, to receive the top edge of the bottle mouth and thereby center and hold the upper end of the bottle. Each throat or guide 13, is held by gravity to its seat in the disk, the guides being supported by their top flanges, and hence the guides are free to move vertically to accommodate bottles varying in length.

The movable bottle carrying or feed table 16, is centered on the sleeve 11, and is carried by and arranged at the upper end of a vertically adjustable sleeve 17, rotating with and surrounding the sleeve 11. The sleeves 11 and 17, are constantly held to rotate together by key 18, fitting an elongated key seat in the sleeve 17, to permit vertical adjustment of said sleeve on sleeve 11.

The sleeve 17, and the bottle feed table carried thereby, are held in the desired vertical adjustment by the nut 19, on which the lower end of sleeve 17, rests. This nut meshes with the exteriorly and longitudinally threaded lower portion 20, of the sleeve 11. The nut 19, can be provided with an exterior handle or wheel, whereby the nut can be conveniently turned to raise or lower the bottle feed table to the desired distance from the stopper-guide-carrying disk 12, to receive bottles of different heights.

The non-rotating work platform 21, in the specific example illustrated, is formed with an opening receiving and in which the bottle-feed table 16, rotates, and said platform can also be formed with an opening 22, through which the sealing head post 4, extends loosely to permit vertical adjustment of said platform.

The top face of the work platform is preferably approximately flush with the top face of the bottle-feed-table rotating therein so that the open bottles can be easily pushed from the platform onto the table and from the table onto the platform. It is hence desirable that the platform be adjustable vertically with said table in order to maintain their desirable relative positions. I can hence support the platform by the converging depending braces or supports 23, secured to the under side of the platform and at their lower ends secured to a non-rotary collar 24, loosely embracing the sleeve 17, and resting on an annular shoulder thereof or on the upper end of the nut. The sleeve 17, rotates in said collar and the platform will be held against rotation, for instance by the post 4, while the platform will move vertically with the bottle-feed table as the nut 19, is adjusted.

From the foregoing it will be observed that the bottle-feed table and the stopper-guide-head rotate in unison and that the table is vertically adjustable relative to the said head. Various means can be employed to rotate or impart the step by step movement to said table and head.

*Bottle feed drive.*—At present, I prefer to employ approximately the bottle feed drive shown more particularly in Figs. 9 and 10. In the specific example illustrated, the lower end of sleeve 11, is formed by or consists of a collar 25, fixed to the sleeve proper, and exteriorly formed with an annular series of equally spaced beveled ratchet notches 26. The ratchet notches are successively engaged by a spring held pivoted dog or pawl 27, having a laterally shouldered free end to enter each notch and rotate the sleeve when the dog is moved in one direction and to slip loosely along the notches when the dog is moved in the opposite direction. This dog is, at its outer end, pivoted by vertical bolt or pin 28, to a horizontal slide 29, which is formed with a longitudinal slot 30, in which bolt 28, can be adjusted when necessary to adjust the position of the dog with respect to the ratchet teeth or notches. The slide is arranged beside the toothed collar 25, and the dog extends horizontally and laterally therefrom and its free end is yieldingly held to the collar by spring 31. The slide is held to reciprocate in a horizontal slideway formed on a bracket 32, fixed to and projecting laterally from the base 1. The slide is moved on its feeding or sleeve driving stroke by a circular cam 33, fixed on the constantly rotating main shaft and having the continuous side cam face or edge, to which one end of the dog-carrying slide is constantly held by the spring 34, secured to the slide and supporting bracket. If so desired, the cam contacting end of the slide can be formed by an anti-friction roll 35, traveling on the working edge or face of the cam. The throw of the slide as controlled, by the cam is sufficient to move the sleeve a distance equal to the space between two ratchet notches. The cam is formed to cause one complete reciprocation, that is one feeding stroke of the slide and dog, for every complete revolution of the main shaft.

The number of ratchet notches or teeth 26, is equal to the number of steps or intermittent movements necessary to a complete rotation of the bottle-feed-table and hence the number of ratchet notches is the same as the number of bottle holders carried by said table. The cam 33, and the sealing head actuating eccentric are so arranged that each time the table stops a bottle, or at least a bottle holder, will be presented at the sealing position, and the sealing head will perform a sealing stroke and withdraw, while the table is stationary during the interval when the table driving dog 27, has completed its feeding stroke and before the roll 35, is again engaged by the feed stroke incline of the cam 33.

*Bottle carrying and elevating devices.*—The bottle feed table is provided with an annular series of equally spaced bottle holders or supports, and each holder is arranged directly below and alined with a stopper guide or throat 13, of the head 12, which rotates in unison with said table, so that a guide 13, is provided above each bottle holder.

Various constructions of bottle holders can be employed, although, at present, I prefer approximately the form shown in the drawings, wherein each holder is shown consisting of a metal cup or disk 36, having a flat cushioning material floor or seat 37, and a central or concentric depending guide leg or stud 38. The top surface of the holder is preferably flat so that the bottles can be readily placed on the cushioning floor, and so that the bottles can readily slide from said holders onto the table, when the holders are in their normal lowered positions.

The table 16, is formed with depressed seats or sockets 39, to receive the holders and in which they are free to reciprocate vertically, and an open neck 40, depends from the center of each socket to receive the shank or leg 38, of the holder with a sliding fit. The shank 38 depends a distance below said neck and its lower end can be beveled off on one side if so desired. Also, if desired, a screw and slot can be provided (see Fig. 13) to prevent turning or axial movement of each holder in its socket and yet so as not to interfere with the free vertical movement thereof.

The holders normally rest by gravity on the bottoms of the sockets, with their top faces approximately flush with the top face of the table, and the top face of the table outside of the holders is preferably flush with the top face of the work platform.

Opposite or inwardly of the bottle holders, I usually arrange suitable bottle guides, gages or stops. In the present instance, each such stop consists of a base 41, resting on and adjustably bolted to the top face of the table, between a holder and the center of the table, and at its outer end having a vertical portion provided with a pair of outwardly projecting horizontal diverging rigid plates or jaws forming the V-shaped stop 42, arranged a distance above and projecting over the bottle holder, to properly hold or center the bottle on the holder against inward and lateral movement. As indicated by Figs. 1 and 6, the open bottles can be placed on the front portion of the work platform, and placed one at a time on the bottle holders as they reach the front of the platform, each bottle being placed in a V-shaped stop or guide 42, which causes proper positioning of the bottle on the holder.

The bottle sealing point or position, in the specific example illustrated, is diametrically opposite the point where the bottles are placed on the holders, that is the sealing position is at the rear of the table and platform. To prevent outward movement of the bottles from the holders, while moving, around to the seating position, I can provide a curved guide 43, arranged above the platform and table and supported by brackets 44, secured to the work platform, as illustrated, for instance in Figs. 1 and 6. This side guide 43, preferably terminates just in advance (in the direction of movement of the table) of the sealing position.

The bottle feed table is so positioned with respect to the stopper guide carrying head 12, as to leave ample room between the table and head, to permit placing of the bottles on the holders, *i. e.* the normal distance between the guides of said head and the bottle holders of said table is greater than the height of the longest bottle of the series being handled.

It is necessary that each bottle, when at the sealing position, be tightly clamped or gripped between its holder and its stopper guide. To accomplish this result, I arrange a yieldingly upheld bottle-lifting cam 45, below the bottle sealing position and adapted to successively engage the downwardly projecting shanks 38, of the bottle holders and thereby elevate said holders and the bottles carried thereby into tight gripping engagement with the stopper guides. This cam is provided with an inclined upper face to engage the beveled lower ends of the bottle holder shanks and force the same upwardly as they ride forwardly on the cam.

At the highest or elevated portion of its top face, the cam is usually formed horizontal or flat (see dotted lines Fig. 1) directly beneath the bottle sealing position, that is directly below the sealing plunger, on which the bottle holder shanks rest during the sealing operation. From its said highest portion the cam extends rearwardly (in the direction of movement of the bottle feed table) and inclines downwardly a distance equal to or slightly in excess of the distance between two bottle holders. In other words, the working face of the cam is long enough to simultaneously act on two bottle holders, the holder of the bottle at or approaching the bottle sealing position, and the next holder to the rear and carrying the bottle at or approaching the position where a stopper is deposited in the stopper guide of such second bottle, whereby said second bottle has been lifted almost to its guide before the table stops to permit delivery of a stopper into said guide, and sealing of the preceding bottle then located at the sealing position.

The complete elevation of each bottle at the sealing position is effected by the cam, as the table completes each stroke or step so that when the table comes to rest the bottle will be elevated in forcible engagement with its stopper guide for the purpose of properly centering the bottle mouth in the guide to insure proper transfer of the stopper from the guide into the bottle mouth.

At the sealing position, it is desirable to yieldingly hold or press the stopper guide down on the bottle mouth, and hence permit upward yielding of the stopper guide to receive bottles of different lengths, and to hold the guides down when the sealing plunger withdraws therefrom. As a convenient means for yieldingly resisting upward movement of each stopper guide when located at and when closely approaching the sealing position, I can provide a horizontal presser plate 46, arranged closely over the top surface of the stopper guide carrying head. This plate is so arranged that as each guide approaches the sealing position it will pass under the plate which yieldingly resists upward movement of the guide. The plate is formed with an opening 47, under the sealing plunger, and this opening registers with the upper end of the bore of the stopper guide at the sealing position so that the sealing plunger can pass down through said opening and the guide. The top edge of the guide however engages the pressure plate around opening 47 to hold the guide to the bottle mouth, yet not with sufficient pressure to break bottles for which the machine is adjusted. This plate projects outwardly beyond the guide carrying head and is carried by a stationary bracket 48, secured to and projecting laterally from the upper end of sealing head post 4. The plate is held against horizontal movement and permitted to move vertically only by a pair of vertical rods 49, secured to the outer end of the plate and depending loosely through and adapted to slide vertically in parallel holes in the bracket 48. The plate is yieldingly held down to its normal position on the top face of the head 12, by an expansive coil spring 50, on one of the rods 49, and compressed between the under face of bracket 48, and a collar on the lower end of said rod.

The lifting cam 45 is arranged just below the bottle feed table and between the post 4, and the table carrying sleeve, and is carried and yieldingly upheld by any suitable spring mechanism. For instance, I show the cam suitably secured on the upper end of a depending vertical rod 51, passing through and slidable in a vertical guide 52, formed on the front portion of sleeve 53, on the post 4 but held against turning or axial movement. A stiff expansive coiled spring 54, is arranged on the rod or stem 51, and is compressed between an end wall of the guide and an annular shoulder on the stem to yieldingly hold the cam at its limit of upward movement. The tension of the spring 54, can be varied by the nut 55 on the lower end of the rod 51.

The cam adjusting sleeve 53, is supported and vertically adjusted by the nut 56, meshing with the longitudinally exteriorly threaded portion 57, of the post 4, as fully shown by Fig. 13 of the drawings. This nut 56, can be provided with an exterior handle or wheel 58 for convenient rotation thereof for the purpose of raising or lowering the normal position of the cam 45. Ordinarily the cam is arranged a certain distance below the bottle feed table, and hence when the vertical position of said table is varied, the cam is also adjusted to maintain its normal position with respect to the bottle holder shanks. Said cam can also be adjusted independently of the adjustment of the table to elevate the bottles the desired distance to bring about the desired contact between the bottle mouths and stopper guides.

The spring 54, yieldingly upholds each bottle during the sealing operation and resists the downward pressure of the sealing plunger on the bottle, and is designed to give or yield sufficiently under excessive pressure to avoid bottle breakage. It will be observed that while the bottle is in the sealing position it is held by two opposing springs, to wit;—spring 50, pressing down pressure plate 46, and spring 54, holding up the bottle lifting cam.

Each step or movement of the bottle feed table presents a bottle, or at least a bottle holder, at the sealing position, and suitable mechanism is provided to lock the table and the stopper-guide-head 12, against movement, until the sealing head has performed its sealing and return strokes. As a means which can be employed for this purpose, I form the periphery of the head 12, with an annular series of equally spaced vertical locking grooves or notches 59, each arranged opposite a stopper guide, and adapted to receive a vertical reciprocating locking rib or flange 60, arranged longitudinally on the front face of the vertical guide block 61, depending from and fixed to the reciprocating sealing head.

The locking flange 60, is disengaged from the stopper guide head 12, when the sealing head is in its normal elevated position, but when said head and the bottle feed table complete a step or movement, the sealing head descends and the flange 60, enters the locking notch 59 and thus locks the bottle feeding parts until the bottle sealing and return strokes of the sealing head are completed. The bottle feed table and stopper guide head then start on another movement or step to pass the sealed bottle forwardly from the sealing position, whereupon the shank of the holder carrying said bottle passes from contact with the lifting cam 45, permitting the holder and its sealed bottle to drop to normal position.

Various means can be employed to automatically remove the sealed bottles from the bottle feed table. As a convenient means which can be employed for this purpose, I show a curved vertically disposed guide plate 62, secured by brackets 63, to the work platform and having its free end 64, extended inwardly above the bottle feed table and curved rearwardly to form a wiper or switch arranged in the path of the advancing sealed bottles to deflect each bottle outwardly from its holder and the table and onto the work platform. The wiper 64, is usually arranged to engage the bottle sides below the V-stops 42, and deflect each bottle from its holder and stop, and the row of bottles thus formed on the work platform is moved forward by the pressure of each bottle before it leaves the table and while being propelled by its V-guide or stop 42.

*The stopper feed.*—Various means can be provided for supplying stoppers successively to the stopper guides or throats as they stop at the stopper receiving position. I preferably arrange the mechanism so that each stopper guide, provided a bottle is below the same, should receive a properly positioned stopper at the last halt or stop made by the guide before it reaches the sealing position, although I do not wish to strictly so limit my invention.

Certain devices embodied in the machine disclosed, are particularly adapted to handle and manipulate the seal or stopper disclosed in my pending U. S. Patent application S. No. 343,065, filed Nov. 12, 1906, and wherein the sealing medium disk 65, is secured in and depends from a sheet metal cap 66, provided on its top with an expansible spring retainer 67 at one end connected to the cap and at its opposite and free end having an inwardly extending finger pull piece 68, normally resting on and about radially of the cap top. The retainer can be formed at its lower edge with an inturned flange resting on the cap top and at its upper edge with an out turned locking flange. This seal is particularly adapted to seal a bottle having an internal annular groove in the wall of its mouth and forming the annular sealing seat 69, and the upper annular locking shoulder 70. However, I do not wish to limit my present invention to employment with such specific form of stopper or seal nor to such specific form of bottle.

It is obvious that a stopper must be placed in each guide or throat with the cork or other sealing disk face down, and if so desired, a stopper might be so inserted by hand in each guide before it reaches the sealing position. The spring retainers of each stopper normally overhang the cap and cork, and the internal diameter of each stopper guide or throat is usually such that the said retainers of the stoppers will press against or have a certain degree of frictional contact with the inner surfaces of the guide bores, to prevent the stoppers dropping therethrough. It is desirable, that each stopper be properly and horizontally positioned in its guide before the sealing plungers act thereon, and preferably that the stoppers be forced to the lower ends of the guides resting or almost resting on the bottle mouths, when each bottle is presented at the sealing position. I provide means for thus preliminarily positioning the stoppers in the guides, whether the stoppers be inserted in the guides by hand, or whether they be presented thereto by mechanical feeding devices. As an example of means for thus positioning the stoppers, I show a vertically reciprocating and yieldingly held stopper positioning head or plunger 71, consisting of a horizontal disk formed to engage the upper end of each stopper and force the same, in proper horizontal position, down through the guide about to the lower end thereof, but preferably not completely through the guide. This head 71, is of less diameter than the bore of the guide, and usually is of a diameter to extend down within the retainer of the stopper and engage the bottom horizontal flange thereof. The head 71, is carried by a vertical upwardly extending stem 72, carried by and passing loosely through the arms 73, rigid with and projecting laterally from the sealing head. The stem is held down to its normal position, with respect to the sealing head, by coiled expansive spring 74, arranged on the stem between the two arms and compressed between the upper arm and a stop on the stem. The head 71, can hence properly position the stoppers under a yielding pressure, and in the event of disarrangement of parts, the head 71, can yield or remain at rest without jamming or breaking of parts, while the sealing head performs and completes its sealing stroke. I preferably so arrange the arms 73, through which the head 71 is carried by the sealing head, that the said stopper positioning head is arranged in the vertical line or axis of and normally above the guide located one step or movement from the sealing position. In other words, the said head is arranged to position a stopper in the guide halted at the stopper receiving position, or each guide when located at its last stop or halt before it reaches the sealing position. The stopper positioning head is normally elevated, as shown in Figs. 1, 2 and 14, during the movement of the bottle feeding table and stopper-guide head. When these parts come to rest on the completion of each step or movement, the sealing head descends on its sealing stroke, and when the sealing head has partially completed its sealing stroke, the stopper positioning head passes down into the guide next to the one through which the sealing plunger has passed, and properly positions the stopper therein, and then starts on its upward or return stroke with the sealing head but usually before the sealing plunger starts on its upward movement because of the springs holding down the sealing plunger as hereinafter set forth, as seen for instance by reference to Fig. 15. Fig. 1, for instance, shows the position of the parts after the sealing head has started on its downward sealing stroke and the sealing plunger has entered the stopper guide but not reached actual sealing position; the stopper positioning head having started on its operating stroke but not reached the stopper guide in which it is to operate.

I prefer to employ means whereby the stopper positioning head is utilized to force stoppers into the guides, stoppers being successively presented to said head right side up, by suitable feeding means. For the purpose of thus feeding the stoppers into position to be engaged by said head 71, I provide a horizontal flat-face constantly rotating circular disk 75, arranged within the stationary annular flange or wall 10, and above the fixed top plate 9. The top surface of this feed disk 75, is approximately in the same horizontal plane as the top surfaces of the stopper guides when in their normal positions, and the edge of the disk is separated from the outer portion of the movable stopper-guide head 12, by the upwardly projected wall or flange 10.

The feed disk 75 is fixed to the upper end of and is rapidly rotated by the vertical drive shaft 76, mounted and arranged longitudinally in the fixed hollow column 8. The vertical shaft 76, is driven by the main shaft 2, through the medium of bevel gearing 77. The stoppers are placed or otherwise delivered on the top face of the rotary feed disk 75, with their cork faces down and with their retainers at the tops thereof. A suitable curved guideway is provided over the surface of the disk and about tangentially through the annular fixed wall 10, and terminating with a discharge opening above and alined with the stopper positioning head 71, and a stopper guide at the stopper receiving position. This guideway can be formed by the inner surface of the fixed wall 10, and by a curved plate 78, arranged concentrically with said wall 10, and over the surface of the feed disk 75, and spaced a distance from the inner surface of wall 10, to form a guide way slightly wider than the greatest diameter of the stoppers to permit free passage therethrough of a single row of stoppers, that is the stoppers can pass along said guideway one behind the other. The floor of the guideway is formed by a portion of the top surface of the rotary feed disk near the edge thereof. The inner plate 78, can be carried by elevated cross plates or brackets 79, from the fixed wall 10, and carrying a plate 80, forming a top guard for the guideway to prevent the stoppers piling therein by moving one on the other. The guideway is open at its rear end 81, see Fig. 8, and extends forwardly from said open end in the direction of rotation of the plate so that centrifugal action will tend to move stoppers, on the top face of the plate, toward the periphery thereof and into the open or entrance end 81, of the guideway, and the stoppers will enter the guideway one at a time, forming a row therein, still resting on and driven forward by the disk.

At a point opposite or adjacent to the stopper-guide stopper-receiving position, an opening or passage is formed through the fixed wall and the discharge end of the guideway is continued through said opening, see Figs. 1 and 8, about tangentially of the wall 10. The guideway is continued outwardly from said wall 10, and over the stopper guide head 12, in a block 82, rigidly secured to the wall 10, and projecting outwardly and horizontally therefrom over the head 12. The stopper guide or slideway in said block 82, terminates in a vertical opening 83, completely through and registering successively with the bores of the stopper guides as they stop at the stopper-receiving position. This opening 83, is also in the path of movement of the plunger head 71, and is of a size to permit the plunger and a stopper to pass therethrough into the stopper guide below.

The rapidly moving feed disk 75, constantly tends to drive the stoppers forward through the guide or slideway and the pressure of the row of abutting stoppers on the feed disk constantly tends to push the stoppers between the disk and the discharge opening 83, forward to said opening. Unless some stop or gate mechanism be employed, as fast as one stopper entered said opening, the stopper behind would also crowd to or drop through the opening without reference to whether bottles had been supplied beneath all of the stopper guides, and with a possible tendency to interfere with the proper individual or separate feeding of the stoppers through said discharge of feed opening to the stopper guides. I hence generally prefer to employ, although I do not wish to so limit all features of my invention, a suitable stop or gate mechanism to permit passage of a stopper to said feed or discharge opening, only when a bottle is located in the holder under the stopper guide to receive such stopper. As a means which can be employed for this purpose, I show a horizontal swinging or rocking stop arm or gate 84, extending inwardly over the top surface of the stopper guide head 12, and at its free end having a lateral beveled stop projection finger or toe 85, normally extending through the block 82, and into the stopper slide or guideway therein to engage and hold back the foremost stopper in said way and hence hold back the entire row of stoppers against forward movement, as shown in Fig. 8. A suitable spring, such as 86, can be coupled to said gate or some part connected therewith to yieldingly hold the same in its normal closed or stopper retarding position. Suitable means are provided to momentarily open said gate for the passage of a single stopper whenever a stopper guide passes beneath the discharge opening 83, if a bottle is arranged under said guide. For this purpose I show the gate or arm 84, fixed to the upper end of a vertical rock shaft 87, mounted to rock in a vertical bearing in bracket 88 fixed to the post 4. A horizontal operating or cam finger or arm 89, is fixed to the lower end of said rock shaft and projects inwardly therefrom with its free bottle engaging cam end 90, normally held by spring 86, in the path traveled by the bottles. The moving bottles successively engage said cam end 90, and thereby swing the arm 89, outwardly causing withdrawal of the gate 84, 85, and permitting passage of a stopper to the discharge opening 83. The bottle quickly moves past the cam end 90, permitting return of the gate to normal closing position crowding back the stoppers pushing forward behind the stopper which passed the gate. The cam end 90, is preferably arranged to engage and be operated by each bottle as it makes the step or movement terminating at the stopper receiving position. If a bottle holder moves to the stopper receiving position, without a bottle, no stopper will be fed into the guide above said holder, as the presence of a bottle is necessary to cause opening of the gate to permit passage of the stopper to the guide over the empty bottle holder.

*The stopper selecting devices of the automatic feed.*—I preferably employ means for automatically feeding properly positioned or selected stoppers to the rotary feed disk 75, or to any other means which might be employed for delivering properly positioned stoppers successively to any suitable devices for applying the stoppers to the bottles. As at present advised by experience, I prefer to employ automatic stopper selecting or positioning mechanism of the type disclosed in the accompanying drawings, wherein I show a horizontally disposed rotary stopper receiving box or cylinder 91, suitably mounted and supported, a distance above the feed disk 75. In the specific example illustrated, the rotary cylinder has open ends, over which stationary heads are arranged, and the cylinder is carried by and rotates in said heads. The fixed rear end head 92, closes the rear end of the cylinder which fits and rotates within the annular encircling flange of said head. This head 92, is secured to and supported by the bracket 93, secured to the stationary vertical flange or wall 10. The stopper discharge chute from the rotary box or cylinder passes through this fixed rear wall, as hereinafter pointed out. The front end of the rotary cylinder or box fits and rotates within the annular encircling flange of the fixed front end head 94, which is supported by the rigid depending arm or bracket 95, secured to the fixed wall or flange 10. This front end head is formed hollow with a downwardly inclined front wall and a rear open end coinciding with the front open end of the cylinder. An upwardly flaring funnel 96, is fixed on the top of said head 94, and opens thereinto so that the funnel and head form a hopper into which the stoppers are thrown promiscuously and by which the mass of variously positioned stoppers are guided and discharged into the interior of the rotary box 91.

Any suitable means can be provided for constantly rotating the box 91, in the same direction during the operation of the machine. For instance, I show exterior bevel gear wheel 97, fixed on the rotary box and meshing with the bevel pinion 98, fixed on the upper end of shaft 76, projecting above and driving feed disk 75.

The mass of stoppers rest in the lower portion of the box and is being constantly shifted and rolled over during the rotation of the box. The box is designed to properly position these stoppers and deliver them onto the rotary feed disk with their cork or sealing-material faces down. The interior formation of the box is such that stoppers assuming a certain position will be carried up and over, as the box rotates, and delivered to a discharge chute or table within the box, or in other words, the delivery device from the box can be arranged to receive only those stoppers which are presented thereto in the proper position. Various means can be employed to attain these results. For instance, I show an arrangement wherein permanent magnets are employed to lift the stoppers and deliver the same to the discharge from the box and as the magnets can carry the stoppers only when the tin or other metal tops are presented thereto, stoppers so positioned that their cork faces engage the magnets will not be picked up and carried thereby to the discharge.

In taking advantage of the laws of magnetism, I form the interior surface of the rotary box of spaced parallel longitudinal magnetized metallic bars or magnets 99, and suitable material intervening between the magnets which will not interfere with the action thereof on the stoppers within the box. These bar magnets 99, are preferably set in the inner surface of the box so as to be approximately flush therewith, and usually extend throughout or approximately throughout the length of the box. I also usually arrange the bar magnets in pairs spaced a distance apart less than the extreme diameter of the stoppers, so that the pair of magnets can coöperate in holding a stopper, see Fig. 11, with the metallic top of the stopper resting against both magnets and held thereto by magnetic attraction. The magnets are not of sufficient strength or power to hold and lift the stoppers with the cork faces thereof against the magnets, and hence the magnets will only attract the stoppers with sufficient force to lift and carry the same when the metal tops of the stoppers come in contact with the magnets, that is when the stoppers are in certain positions. Furthermore, I usually so arrange the magnets or employ magnets of such power or formation, that when arranged in pairs about as shown, the stoppers will be drawn flat against the inner surface of the rotary box with their cork faces outwardly, and be thus carried around as the box rotates.

Means are provided within the rotary box to strip or remove the properly positioned stoppers from the magnets carrying the same, and thus cause the stoppers to drop into a discharge or delivery device with their cork sides all facing in the same direction. In this connection, I arrange a fixed support, frame or bar 100, within the rotary box, extending throughout the length thereof and secured to and carried by the fixed heads 92, 94. This support is arranged adjacent to the downwardly moving inner surface of the box about midway between the highest and lowest portions of the box interior, and carries a series of spaced curved stripping fingers 101, fixed to and projecting upwardly from the longitudinal top edge of the support with their rearwardly curved free ends located in spaced annular grooves 102, in the inner surface of the rotary box including said magnets. The longitudinal fixed support forms a longitudinal stopper discharge guideway longitudinally open at the top, one wall of which is formed by the row of strippers 101, and the opposite wall of which is formed by the upwardly projecting rounded or enlarged longitudinal edge of the front plate 103, forming a part of the longitudinal support and spaced from and at its lower portion secured to the main bar 100, of said support. The floor or bottom of said discharge guideway is formed by the longitudinal tilting lever or platform 104, fulcrumed near its front end on a transverse pivot 105, to tilt vertically so that its rear free end can drop, as shown by dotted lines Fig. 16, below the discharge slit or opening 106, through the rear head 92. The tilting platform 104, is upheld in its normal horizontal position, by any suitable means, for instance by spring 107. The platform is periodically tilted to discharge the stoppers resting thereon, through the opening 106, by any suitable means. For instance, I show a transverse rock shaft 108, mounted in and extending through the front hopper head 94, and at its inner end provided with a lateral lifting toe 109, on which the free front end of the tilting platform rests, so that the rock shaft is yieldingly held in its normal position by the spring 107. The outer end of the rock shaft is provided with the lateral operating or striker finger or arm 110, projecting rearwardly at the exterior of the rotary box into the circular path of movement of the cam or rib 111 arranged on the exterior of the rotary box. On each revolution of the rotary box, the cam 111, engages the arm 110, and thereby rocks said shaft to lift toe 109, and thereby tilt the platform 104 to discharge the stoppers thereon from the rotary box. When the short cam 111, slips past arm 110, the spring immediately returns the platform 104, and the rock shaft and its parts to normal position so that the stoppers delivered onto the platform can accumulate thereon during each revolution of the rotary box before the platform is tilted to discharge the same. The stoppers are hence discharged from the platform on each revolution thereof, thereby preventing jamming or wedging of the stoppers which might occur should a fixed inclined stopper chute be employed within the rotary box, although I do not wish to limit all features of this portion of my invention, to the tilting platform. The guide or slide way arranged longitudinally within the rotary box, is of such width that the stoppers drop therein vertically or on edge forming a row of stoppers therein arranged edge to edge with their cork sides all facing in the same direction, toward the open interior of the box. The stoppers cannot enter the way one behind the other or overlapping. The free ends of the strippers project rearwardly (with respect to the direction of rotation of the box) and engage the metal tops of the stoppers as they start to move down at the top of the box, and strip the stoppers from the magnets and guide the stoppers in proper position down into said way.

The stoppers resting on the tilting platform preferably project above the horizontal plane of the longitudinal top edge of the front wall of the way (see Figs. 11 and 17) and hence, when the way is filled with stoppers, will prevent entrance of any other stoppers that may be brought over by the magnets, before the platform is tilted, as the projecting upper ends of the stoppers in the way will deflect the additional stoppers and cause them to drop off to the bottom of the rotary box. I also usually so arrange the cam 111, (see Fig. 17) so that the platform will be tilted and allowed to return while no stopper carrying magnets are passing the strippers.

The stoppers are discharged from the tilting platform through the opening 106, in the box end head, in vertical position or on edge, one behind the other. The stoppers pass in this position into a stationary chute 112, extending from said rear end head downwardly with its open discharge end over the rotary feed disk 75, in advance of or adjacent to the entrance 81, to the stopper guideway along said disk. The walls of this chute are arranged to permit the stoppers to slide freely therethrough by gravity and yet maintain the stoppers in their proper positions one behind the other. The chute gradually curves between its receiving and discharging ends, (see Figs. 3 and 17) to deliver the stoppers horizontally onto the feed disk, flat cork faces down, in proper position to be passed into the feed way along said disk and to the stopper guides for the bottles.

I do not wish to limit my stopper feeding and selecting or positioning devices, to use in connection with the particular bottle feeding, sealing and other mechanisms shown nor to use in connection with the particular stopper shown, as said devices can be adapted to other stoppers and to other bottle feeding and sealing mechanisms.

*The stopper applying and sealing devices.*—The vertically reciprocating sealing head is arranged above the stopper guide carrying head 12, and, in the specific instance shown, comprises a vertical hollow cylinder or casing 113, formed or provided with a rigid rearwardly extending arm 114, suitably fitted and secured on the upper end of the slide rod 5, which carries the sealing head. The sealing head is held and guided to move in a fixed vertical line by suitable means. For instance, I show the vertical guide and locking block or bar 61, at its upper end secured to the sealing head. This block slides in a vertical guideway formed in the front end of the collar 115 fixed on the upper end of the stationary post 4. This block 61, serves the double purpose of guiding the sealing head and of locking the bottle feed table and stopper guide head during each sealing operation as hereinbefore described.

The sealing head carries the devices for engaging each stopper and properly seating, compressing and insuring proper locking thereof in the bottle mouth. In the specific example shown, said devices comprise a sectional or multiple plunger and certain spring devices acting thereon.

I show the upper end of the casing 113, internally threaded to receive the vertically adjustable threaded top or nut 116, screwing into said casing. The lower end of the casing is formed with an internal stop shoulder 117, limiting the downward movement of the vertically yielding or sliding block, holder or chuck 118. This holder is held to the shoulder by the strong or heavy coiled spring 119, compressed between the upper end of the holder and nut 116.

The outer section or member of the stopper compressing plunger is carried by the plunger holder 118, and consists of a strong hollow metal cylinder or tube 120, depending from the holder and at its upper end removably fitted in a socket therein and secured by suitable means, such as set screw 121, (Fig. 11). The lower end of this hollow cylinder 120, is longitudinally slotted at equally spaced intervals to form the annular series of similar equally spaced vertical spring or yielding tongues or fingers 122, normally arranged in a circle of the same diameter as the non-slitted portion of the cylinder, and thereby forming a contractile spring plunger, the lower or working end of which can be contracted, against the tension of said fingers, to reduce the diameter of said working end.

Within and normally projecting below the outer plunger or plunger section 120, I preferably arrange an inner plunger or plunger section fitted to and bearing against the lower end of a holder 124, extending longitudinally through the tubular plunger 120, and the holder 118, and having a sliding fit therewith and capable of moving longitudinally therein. This longitudinal holder 124, extends axially through the casing and loosely into the cap or nut 116, and is guided thereby in its longitudinal movement. The holder 124, is yieldingly held to its limit of downward movement by a comparatively light coiled spring 125, on the holder and compressed between nut 116, and a shoulder 126, rigid with the holder and normally engaging the upper end of chuck or holder 118.

The holder 124, extends longitudinally into the outer plunger 120, and the inner plunger is arranged concentrically within said outer plunger, and comprises a shank 123, fitted in the lower end of said holder 124, and a metal head fitting and abutt against the lower end of said holder and provided or formed with the inner depending hollow contractile spring plunger arranged concentrically within the outer contractile plunger section 122, and formed by an annular series of vertically disposed or longitudinal spaced spring fingers or tongues 127. These fingers 127 normally diverge to form the inner plunger flaring, and at their lower free ends are turned outwardly at right angles to form the horizontal feet 128, normally projecting outwardly below the bottom edge of contractile plunger 122.

The springs 119 and 125, hold the two-part contractile plunger at its normal position, its limit of downward movement, (see Figs. 11 and 12) with the inner plunger section yieldingly held by its spring 125, projecting a distance below the outer plunger section.

When the sealing head makes its operative downward stroke, the two-part plunger passes into the stopper guide into engagement with the stopper arranged horizontally across the lower end of said guide. The outer section of the plunger, in its normal expanded position, snugly fits within said stopper guide and its bottom edge is normally of a diameter to move down on and engage the horizontal top locking flange of the stopper retainer while such retainer is in its normal expanded condition as it usually is while in the stopper-guide. The inner plunger section in its normal position projects below the outer section about such a distance that preferably before the outer section engages said locking flange, the inner section extends down and fits snugly within the retainer and engages the metal top of the stopper. Under the continued downward movement of the sealing head, the central or inner plunger section by its spring 125, carries the stopper down until its compressible disk initially engages the bottle mouth sealing seat 69, with the retainer locking flange in the contracted portion of the bottle locking shoulder. It is thus necessary to compress the said disk under great pressure to effect the tight seal desired and to carry the retainer locking flange a distance below the locking shoulder 70, so that when said flange has passed below said shoulder the retainer can spring outwardly or expand to its normal position and throw its locking flange below the locking shoulder 70 and thereby lock the stopper in and seal the bottle as shown in the left hand bottle mouth of Fig. 15. When the resistance of the stopper against further downward movement in the bottle mouth, overcomes the force of the comparatively light spring 125, the continued downward movement of the sealing head causes said spring to yield or compress while the outer plunger section continues its downward movement by reason of its stronger spring 119 to force down the stopper and tightly compress the compressible disk thereof against the bottle sealing shoulder to the necessary extent to permit engagement of the retainer beneath the bottle locking shoulder. When the stopper is forced through the contracted throat of the bottle mouth above the locking shoulder 70, the retainer is by contact with the wall of said throat, drawn in or contracted from its normal position, and the inner and outer plunger sections are likewise contracted against the tension of their spring tongues or fingers, and hence when the stopper is compressed to bring the retainer locking flange below said shoulder 70, the retainer is free to expand and return to its normal position and it is assisted in this movement and is aided in properly seating and centering below the locking shoulder by the expansion of the inner contracted spring plunger section fitted within the retainer and tending to expand therewith. The continued downward movement of the sealing head brings the lower end of the outer plunger section, which has also been contracted by engagement with the bottle mouth throat, down onto the feet 128 of the inner plunger section in applying the great compressing force to the stopper, see Fig. 15.

What I claim and desire to secure by Letters Patent of the United States is;—

1. A bottle sealing machine having a multiple sealing plunger comprising yieldingly held concentrically arranged plunger sections, one section having a contractile spring working end normally projecting below the other section and movable upwardly independently thereof and into operative engagement with the working end thereof.

2. A bottle sealing machine having a sealing plunger with a contractile spring working end adapted to enter the bottle mouth in forcing the stopper thereinto and to be contracted by the reduced throat of the bottle mouth and formed with radial feet, said working end adapted to automatically expand when said feet move into the enlarged portion of the bottle throat.

3. A bottle sealing machine having a spring-held sealing plunger with a contractile working end formed by an annular series of longitudinal spaced converging spring tongues or fingers having out-turned lower ends.

4. A bottle sealing machine having a sealing or stopper forcing and compressing plunger comprising a spring held tube having its lower end longitudinally slotted to form spring tongues or fingers, and an independently vertically yielding inner plunger section normally projecting below said tube, said tube adapted to move down on said section and apply stopper compressing pressure through the same.

5. A stopper forcing and compressing plunger comprising a tube having a contractile spring working end, an inner plunger section arranged within said tube and having its working end formed by spring tongues or fingers, and a spring device acting on said tube and section and yieldingly holding said section normally projected below said tube.

6. A stopper forcing and compressing plunger comprising a spring held outer section having a contractile spring working end and an independently yielding spring held inner stopper centering section arranged within the outer section and normally projecting below the bottom working face thereof to engage the stopper top.

7. A stopper forcing and compressing plunger comprising a spring held tube-like outer section having a contractile spring-end, and a spring-held inner section comprising spaced longitudinal spring fingers having out-turned feet, substantially as described.

8. A stopper forcing and compressing plunger comprising several spring held sections, the working ends of said sections adapted to abut one on the other and act as a single plunger in applying the compressing sealing force to the stopper, the working face of one section normally and yieldingly held projecting below the other section to engage and move the stopper to its seat before the application of the final compressing force.

9. A stopper forcing and compressing plunger comprising a spring-held member having an enlarged contractile spring working end, adapted to be contracted by its passage through the bottle throat, and to automatically expand on reaching the enlarged portion of the bottle mouth below said throat.

10. A stopper forcing and compressing plunger comprising an outer spring held section, and an inner spring held contractile spring section having an enlarged working face projecting beneath the lower edge or working face of said outer section, substantially as described.

11. A stopper forcing and compressing plunger comprising a tube having its working end formed by longitudinal spring fingers, and an inner or central section having depending spring fingers with their lower ends projecting radially.

12. A stopper forcing and compressing plunger comprising an outer tube having a contractile spring working end, and a spring held inner central section having a contractile spring working end with outwardly projecting feet beneath the working face of said tube, said central section being reduced in size above said feet and being normally held yieldingly projecting downwardly beyond said tube, whereby said central section after being contracted can expand to project said feet radially while said working end of said tube remains contracted.

13. A stopper forcing and compressing plunger having an outer annular portion to engage the retainer of a stopper, and a central spring held section to engage the stopper top within the retainer, said central section being yieldingly held normally projecting below the horizontal plane of the working face of the outer section.

14. A bottle stoppering machine comprising a sealing head, a stopper forcing and compressing plunger carried and actuated by said head and comprising a compressing plunger section having a contractile spring-working-end, a stiff sealing or compressing spring holding down said section, and a forcing plunger section independent of said sealing spring and provided with a lighter spring yieldingly holding said forcing section down to normal position, extending below said compressing section the working end of said compressing section moving down into compressing engagement with said forcing section.

15. A bottle stoppering machine comprising a sealing head having a hollow casing, a plunger holder slidably confined in said casing, a tube-like plunger section carried by said holder, a stiff sealing spring within the casing and acting on said holder, a central holder passing loosely through said first mentioned holder and provided with an inner or central plunger section projecting below said first mentioned section, and a light spring acting on said central holder and yieldingly holding the same down to normal position and permitting upward yielding thereof independently of said sealing spring.

16. A bottle sealing machine comprising a sealing head, a stopper compressing plunger tube carried thereby, a sealing or compressing spring acting on said tube and operatively interposed between the same and said head, a stopper forcing contractile spring plunger arranged within, movable longitudinally and independently of, and normally projecting downwardly beyond said tube and provided with a light spring yieldingly holding the same in normal projected position.

17. In a bottle stoppering machine in combination, a bottle feeding table, means for imparting a step by step movement thereto, a reciprocating stopper forcing and compressing plunger, a reciprocating head carrying the same, a vertical post, a reciprocating rod guided by said post and actuating and carrying said head, a vertical guide block carried by and moving with said head, said post provided with a guide way to receive the same, and means whereby said block locks said table at each operative stroke of said head.

18. In a bottle stoppering machine, in combination, a bottle feed mechanism, means for intermittently moving the same, a reciprocating sealing head, means for moving the same on its operative stroke after each movement of said bottle feed mechanism, a vertically disposed guide block moving with said sealing head, a fixed member receiving and guiding said block, and means whereby said block locks said bottle feed mechanism during each operative stroke of said sealing head.

19. A bottle stoppering machine, in combination, a rotary bottle feeding table, a disk moving therewith and fixed thereto and provided with an annular series of spaced locking recesses, means for moving said table step by step, and a reciprocating sealing head, a reciprocating block moving therewith and provided with means to successively enter said locking recesses on each operative stroke of said head, and means for reciprocating said head.

20. A bottle stoppering machine, in combination, a bottle feed table provided with a series of vertically movable bottle holders, means for applying stoppers to and forcing the same in the bottles at the bottle sealing position, and a yieldingly upheld bottle holder elevating cam arranged beneath the bottle sealing position and projecting into the path of movement of said holders and adapted to engage each holder and force the same upwardly to carry its bottle up to sealing position and yieldingly uphold the same in such position.

21. In a bottle stoppering machine, in combination, a bottle feed table, means for moving the same, a series of separate spaced vertically movable bottle holders carried by and projecting below said table and adapted to successively carry the bottles to the bottle sealing position, means for applying the stoppers to the bottles at said sealing position, and a yieldingly upheld bottle holder elevating cam arranged beneath the table and having the top cam face on which the lower ends of said holders ride.

22. In a bottle stoppering machine, in combination, a rotary bottle feed table having a series of spaced vertical sockets at their lower ends opening through the table, freely vertically movable bottle holders resting in said sockets with depending shanks projecting below the table, a holder elevating cam arranged beneath the table and having a top cam face to successively engage said shanks and elevate the holders, means for vertically adjusting said cam, and mechanism for applying the stoppers to the bottles.

23. In a bottle stoppering machine, in combination, bottle feed mechanism comprising a series of spaced vertically movable bottle holders moved successively by said mechanism to the bottle sealing position, a yieldingly upheld holder elevating cam arranged in operative relation to said holders as they successively approach the bottle sealing position, a vertically movable support for said cam, means for holding said support in different vertical positions, and means for applying the stoppers to the bottles.

24. In a bottle stoppering machine, in combination, a rotary bottle feed table provided with vertically movable bottle holders supported thereby, means for adjusting said table vertically, a yieldingly upheld holder elevating cam arranged beneath the bottle sealing position, a support for said cam, and means for adjusting said support vertically.

25. In a bottle stoppering machine, in combination, a bottle feed mechanism comprising vertically movable bottle holders, a yieldingly upheld holder elevating cam arranged to successively engage said holders to elevate their bottles to the bottle sealing position, a spring yieldingly holding said cam in operative position, a support for the spring and cam, a frame member on which said support is movable, and means for moving the support thereon and holding the same in the desired adjustment.

26. In a bottle stoppering machine, in combination, bottle feeding means comprising vertically movable bottle holders, a vertical post having a longitudinally threaded portion, a vertically adjustable nut mounted on said threaded portion, a vertically movable sleeve arranged on said post and upheld by said nut, and a yieldingly upheld holder elevating cam carried by said sleeve.

27. In a bottle stoppering machine, in combination, a rotary bottle feed table having a series of bottle holders carried thereby and projecting therethrough, said holders being equally spaced, means for successively applying stoppers to the bottle at the bottle sealing position, and a yieldingly upheld holder elevating cam arranged beneath said table and having a top cam face to engage the lower ends of said holders and successively elevate the same, said cam face in length being approximately equal to the distance the bottle holders are spaced apart.

28. In a bottle stoppering machine, in combination, a frame comprising a vertical hollow post, a reciprocating rod extending thereinto, a sealing head carried by the rod, means for reciprocating the rod, a bottle feed table provided with vertically movable bottle holders arranged to carry the bottles successively beneath said head, a support for said table, operating means therefor, a yieldingly upheld holder elevating cam arranged beneath the table and adapted to successively elevate said holders to raise the bottles to sealing position beneath said head, said cam being provided with a support mounted on said post.

29. In a bottle stoppering machine, in combination, a frame comprising a hollow vertical post, a drive shaft, a vertical reciprocating rod guided by said post and having operative connection to said drive shaft, a sealing head carried by said rod, a vertical column to one side of said post and carried by said frame, a rotary sleeve mounted on said column, bottle feeding means carried by said sleeve and arranged beneath said head, and a step by step driving mechanism between said shaft and said sleeve.

30. In a bottle stoppering machine, in combination, a frame, a horizontal drive shaft having a cam with a side cam face, a reciprocating sealing head, operative mechanism between said head and shaft, a rotary bottle feeding table and a ratchet mechanism for rotating said table step by step, said mechanism being actuated by said cam, said cam having its working edge so arranged that said table will remain at rest while said head performs a complete stroke.

31. In a bottle stoppering machine, in combination, a frame, a reciprocating sealing head, a rotary bottle feed table adapted to successively present the bottles at the bottle sealing position, a pawl and ratchet mechanism for rotating said table step by step, a table lock moving with said sealing head and adapted to lock said table on each operative stroke of said head, a rotary drive shaft, eccentric-operating means between said shaft and said head adapted to move said head on one complete stroke on each complete revolution of said shaft, and a cam carried by said shaft and adapted to actuate said pawl and ratchet mechanism one complete stroke on each revolution of said shaft, said cam arranged to actuate said mechanism on its operative stroke after said head has completed its operative stroke and returned.

32. In a bottle stoppering machine, in combination, a frame, a reciprocating sealing head, a rotary bottle feed table adapted to successively present the bottles at the bottle sealing position, a pawl and ratchet mechanism for rotating said table step by step, a rotary drive shaft, eccentric-actuating means between said shaft and said head adapted to move said head on one complete stroke on each complete revolution of said shaft, and a cam carried by said shaft and adapted to actuate said pawl and ratchet mechanism one complete stroke on each revolution of said shaft, said cam arranged to actuate said mechanism on its operative stroke after said head has completed its operative stroke and returned.

33. In a bottle stoppering machine, in combination, a frame, a horizontal drive shaft having a cam with a side cam face, a reciprocatory slide held yieldingly to said cam face and reciprocated thereby on its operative stroke, a movable dog carried by said slide, and a rotary bottle feed table having a ratchet wheel in operative relation to said dog for moving the table step by step.

34. In a bottle stoppering machine, in combination, a frame having a vertical column, a rotary sleeve mounted on the column and having a ratchet wheel, a rotary bottle feed table carried by said sleeve, a rotary drive shaft having a cam, a reciprocatory slide carried by the frame beside said ratchet wheel and provided with a dog movable laterally to operatively engage the ratchet wheel, and a spring holding the slide to operative engagement with the cam.

35. In a bottle stoppering machine, in combination, a frame, a horizontal drive shaft having a cam with a side cam face, said frame having a horizontal slideway opposite said cam, a reciprocatory slide confined in said way and provided with a spring yieldingly holding the slide to the cam face, a laterally movable spring held dog carried by the slide, and a rotary bottle feed table provided with a vertical sleeve beside said slide and having an annular series of ratchet shoulders in operative relation to said dog.

36. In a bottle stoppering machine, in combination, a frame having a vertical column, a rotary sleeve mounted on said column and at its lower end provided with a collar fixed thereto and having an annular series of exterior equally spaced ratchet shoulders, a bottle feed table rotating with said sleeve and provided with a series of equally spaced bottle holders equal in number to the ratchet shoulders, a rotary drive shaft carried by the frame, and a dog arranged to operatively and successively engage said ratchet shoulders to move the sleeve and table step by step, said dog being operatively moved intermittingly by said shaft.

37. In a bottle stoppering machine, in combination, a frame having a vertical column, a vertically movable and rotary sleeve centered on said column, a bottle feed table carried and rotated by said sleeve, a vertically adjustable non-rotary work platform beside said table and adapted to receive bottles therefrom, and a vertically adjustable nut supporting said sleeve and said platform and whereby the same are vertically adjusted uniformly.

38. In a bottle stoppering machine, in combination, a frame having a vertical column, a rotary sleeve mounted on said column, means for rotating said sleeve, said sleeve having a longitudinally threaded portion, a vertically adjustable nut on said portion, a vertically adjustable sleeve arranged on and rotating with said first mentioned sleeve and upheld by said nut in the desired vertical adjustment, and a bottle feed table carried by said vertically adjustable sleeve.

39. In a bottle stoppering machine, in combination, a frame having a vertical column, a rotary and vertically adjustable sleeve centered on said column, means for rotating said sleeve, a rotary bottle feed table carried by said sleeve, a vertically adjustable non-rotary work platform having a top face approximately flush with the top face of said table, and means for vertically and simultaneously adjusting said platform and the sleeve and table.

40. In a bottle stoppering machine, in combination, a frame having a vertical column, a rotary and vertically adjustable sleeve, a horizontal bottle feed table carried thereby, a vertically adjustable nut upholding said sleeve and table and whereby the same are vertically adjusted, a horizontally disposed work platform held against rotation, and means whereby said platform is upheld and vertically adjusted by said nut.

41. In a bottle stoppering machine, in combination, a frame, a vertically adjustable nut, a rotary and vertically adjustable sleeve upheld by said nut, means for rotating said sleeve, a bottle feed table carried by said sleeve, a vertically adjustable work platform, a non-rotary vertically adjustable sleeve upheld by said nut and carrying said platform, whereby the table and platform are simultaneously and uniformly adjusted vertically by said nut, and means holding the platform against rotation.

42. In a bottle stoppering machine, in combination, a frame, a vertical rotary sleeve mounted on the frame, means for rotating said sleeve step by step, a bottle feed table centered on and rotating with said sleeve and vertically adjustable thereon, and a vertically adjustable nut on said sleeve and supporting said table and whereby the vertical position thereof on said sleeve is determined.

43. In a bottle stoppering machine, in combination, a frame, a horizontal rotary vertically adjustable bottle feed table, means for actuating the same, a horizontal vertically adjustable work platform having an opening in which said table moves, means holding said platform against rotation, a curved guide fixed to said platform to hold the moving bottles on the table, and a bottle switch or wiper fixed to said platform and projecting over said table to deflect the bottles from the table and guide the same onto and along the platform.

44. In a bottle stoppering machine, in combination, a frame, a horizontal rotary bottle feed table, means for actuating the same, a horizontal non-rotary work platform having an opening in which said table rotates, said platform having a top face approximately flush with the top face of said table, a bottle switch or wiper fixed to said platform and projecting over said table to deflect the bottles therefrom and onto the platform, and means for simultaneously and uniformly adjusting the platform and table vertically.

45. In a bottle stoppering machine, in combination, a frame having a vertical column, a rotary sleeve mounted thereon, means for rotating the sleeve, a head carried by and rotating with the sleeve and provided with a series of spaced bottle mouth engaging stopper guides, a vertically adjustable sleeve mounted on and rotating with said first mentioned sleeve, means for adjusting the same vertically, and a rotary bottle feed table carried by and rotating with said adjustable sleeve and arranged below said head.

46. In a bottle stoppering machine, in combination, a frame, a rotary bottle feed table, a head arranged above and rotating with said table and provided with a series of spaced stopper guides, adjusting means for varying the distance between said head and table, means for elevating the bottles carried by said table into engagement with said guides to receive the stoppers therefrom, and stopper forcing and compressing means movable through said guides to bring the stoppers into operative engagement with the bottles.

47. In a bottle stoppering machine, in combination, a rotary bottle feed table, means rotating therewith and arranged above the same and provided with a series of stopper guides, means for successively bringing the bottle mouths and stopper guides into operative engagement comprising a spring whereby the stopper guides and bottles are yieldingly held together, and stopper applying and compressing means movable through said stopper guides for pushing the stoppers through said guides into operative engagement with the bottles.

48. In a bottle stoppering machine, in combination, a rotary bottle feed table having a series of spaced vertically movable bottle holders, a head arranged above said table and rotating therewith and provided with a series of stopper guides above the holders and at their lower ends adapted to receive the bottle mouths, said guides being open at the upper ends to receive the stoppers, means to successively and yieldingly bring the bottles and guides together in operative engagement, and stopper applying means movable through said guides.

49. A bottle stoppering machine comprising a rotary head having a series of spaced vertical openings therethrough, vertically movable hollow stopper guides resting loosely in said openings and having open upper ends to receive the stoppers and beveled lower ends to receive the bottle mouths, a bottle feed below and moving with said head, means to successively bring the bottles and said guides into operative engagement as they approach the bottle sealing position, and stopper applying means movable through said guides, substantially as described.

50. A bottle stoppering machine comprising a rotary head having a series of vertically movable stopper guides extending therethrough and adapted at their upper ends to receive the stoppers and at their lower ends to receive the bottle mouths, a bottle feeding table beneath said head, and rotating therewith, means comprising spring devices to successively bring said bottles and said guides into operative yielding engagement, and stopper applying means movable through said guides.

51. A bottle stoppering machine comprising a rotary head provided with a series of vertical stopper guides extending therethrough and independently movable vertically in the head, bottle feeding means beneath said head, means adapted to successively bring said guides and the bottle mouths into operative engagement, means to successively engage and yieldingly hold down the stopper guides at the bottle sealing position, and stopper applying means movable through said guides.

52. A bottle stoppering machine comprising a rotary head provided with vertically movable stopper guides extending therethrough, bottle feeding means arranged below said head, means to bring the bottles and guides successively into engagement with the bottle mouths fitted to the lower ends of the guides, a plate projecting over said head and under which the guides successively pass, a spring yieldingly holding said plate down to resist upward movement of a guide thereunder, and stopper applying means movable through the guides.

53. A bottle stoppering machine comprising a horizontally disposed movable member provided with a series of independently vertically movable stopper guides adapted to receive the stoppers at their upper ends and having their lower ends formed to receive and center the bottle mouths, means to present the bottles thereto and force the same upwardly thereagainst, a downwardly held spring actuated stop member under which the guides successively pass and which yieldingly forces the same downwardly on the bottle mouths, and a stopper forcing and compressing plunger successively movable through the guides beneath said stop member.

54. In a bottle stoppering machine, in combination, a rotary bottle feed table, means rotating therewith and arranged above the same and provided with a series of stopper guides, means for successively bringing the bottle mouths and stopper guides into operative engagement comprising a spring whereby the stopper guides and bottles are yieldingly held together, means to successively deliver stoppers into said guides, and stopper applying and compressing means movable through said stopper guides.

55. A bottle stoppering machine, comprising a rotary member provided with a series of stopper guides successively brought to the sealing position, a stopper applying plunger movable through each guide when at the sealing position, means to present the bottles successively at the sealing position and hold the same to the guides, and stopper positioning means movable into each guide for depositing and positioning a stopper in the lower portion thereof before the guide reaches the sealing position.

56. A bottle stoppering machine comprising a rotary member provided with a series of stopper guides successively brought to the sealing position, a stopper applying plunger movable through the guide at the sealing position, means to present the bottles successively at the sealing position and hold the same to the guides, and a stopper positioning plunger movable down into each guide from a point above the same to position a stopper therein.

57. A bottle stoppering machine comprising a rotary member provided with a series of stopper guides successively brought to the sealing position, a stopper applying plunger movable through the guide at the sealing position, means to present the bottles successively at the sealing position, and hold the same to the guides, and a yieldingly held vertically movable stopper positioning plunger movable with said stopper applying plunger into a guide adjacent to the guide at the sealing position to position a stopper therein before reaching the sealing position.

58. A bottle stoppering machine comprising a rotary member provided with a series of stopper guides successively brought to the sealing position, a vertically reciprocating sealing head arranged above said member and provided with a stopper applying plunger movable through the guide at the sealing position, and a stopper positioning plunger normally arranged above said member and carried by said head and movable therewith to successively enter the guides before reaching the sealing position to force stoppers thereinto and position the same therein.

59. A bottle stoppering machine comprising a rotary member provided with a series of stopper guides, stopper applying means movable through said guides, mechanism for presenting bottles to said guides to receive the stoppers therefrom, and automatic stopper feed mechanism constructed and arranged to present properly positioned stoppers above the upper end of each guide at the stopper receiving position comprising vertically movable means to force each stopper down into each guide through the open end thereof.

60. A bottle stoppering machine comprising a rotary member provided with a series of stopper guides, stopper applying means movable through said guides, mechanism for presenting bottles to said guides to receive the stoppers therefrom, a stopper feed mechanism comprising a stopper guideway having a discharge opening under which said guides successively pass and through which the stoppers are delivered into the open upper ends of the guides, and stopper controlling means.

61. A bottle stoppering machine comprising a rotary member provided with a series of stopper guides, stopper applying means movable through said guides, mechanism for presenting bottles to said guides to receive the stoppers therefrom, a stopper feed mechanism comprising a stopper guideway having a discharge opening under which said guides successively pass and through which the stoppers are delivered into the open upper ends of the guides, stopper controlling means, and a plunger movable through said discharge opening to force the stoppers down into the guides.

62. A bottle stoppering machine comprising a rotary member provided with a series of stopper guides, stopper applying means movable through said guides, mechanism for presenting bottles to said guides to receive the stoppers therefrom, a stopper feed mechanism comprising a stopper guideway having a discharge opening under which said guides successively pass, and a reciprocating stopper positioning plunger movable down through said guideway to force the stopper therefrom and partially through the guide.

63. A bottle stoppering machine comprising a rotary member provided with a series of stopper guides, stopper applying means movable through said guides, mechanism for presenting bottles to said guides to receive the stoppers therefrom, a stopper feed mechanism comprising a stopper guideway having a discharge opening under which said guides successively pass, a movable stopper gate normally holding back the stoppers against movement to said discharge opening and provided with actuating means for opening the gate and controlled by the bottles, and means for forcing the stoppers through said guideway.

64. A bottle stoppering machine comprising a rotary member provided with a series of stopper guides, stopper applying means movable through said guides, mechanism for presenting bottles to said guides to receive the stoppers therefrom, a stopper feed mechanism comprising a stopper guideway having a discharge opening under which said guides successively pass, a swinging gate having a projecting free end normally extending into said guideway to hold back the stoppers therein, an actuating finger operatively connected with said gate to move the same from the guideway and projected into the path of the bottles, a spring yieldingly holding said gate and finger in their normal positions, and means to deliver the stoppers from said guideway into said guides.

65. A bottle stoppering machine having a stopper feed mechanism comprising a horizontally disposed constantly rotating disk with a plane top face on which the stoppers are delivered properly positioned, and a stopper guideway from said disk through which the stoppers are forced by their frictional engagement with the face of the disk.

66. A bottle stoppering machine comprising a stopper feed including a constantly rotating horizontal disk on the top surface of which the properly positioned stoppers are delivered and a discharge from the periphery of said disk through which the stoppers are passed in a row one behind the other by reason of the frictional contact with the top surface of the disk.

67. A stopper feed mechanism, for bottle stoppering machines, comprising a horizontal constantly rotating disk on the top surface of which the properly positioned stoppers are delivered, a stopper discharge chute extending from the periphery of said disk and a stopper guideway to said chute and arranged over the top surface of the disk, the stoppers in the guideway resting on the top surface of the disk and being propelled by frictional engagement therewith.

68. A bottle stoppering machine comprising a horizontal rotating disk on the top surface of which the properly positioned stoppers are delivered, a circular vertically disposed fixed wall around said disk, a stopper discharge chute extending through said wall from the periphery of the disk, and a curved stopper guide arranged over the top face of the disk and extending from said chute along and spaced from the inner surface of said wall to form a stopper guideway to the chute, wherein the stoppers resting on the top face of the disk are moved by frictional engagement with the disk.

69. In a bottle stoppering machine, a rotary member provided with a series of stopper guides having stopper receiving openings, means to present bottles to the lower ends of said guides to receive the stoppers therefrom, stopper applying means movable through said guides, a constantly rotating horizontal disk on the top face of which the properly positioned stoppers are delivered, a discharge chute from the periphery of said disk and under which said guides successively pass to receive stoppers, and a stopper guide extending over the surface of the disk whereby the stoppers are forced into said chute by frictional contact with the top surface of the disk.

70. In a bottle stoppering machine, in combination, a frame having a column provided with a fixed head and a vertical circular wall rising therefrom, a rotary head centered on said column and provided with a series of stopper guides, bottle feeding means arranged beneath said head to present the bottles to said guides to receive the stoppers therefrom, a stopper discharge chute through said wall to deliver the stoppers successively to said guides, a rotary horizontally disposed disk arranged within said wall and adapted to receive on its top face the properly positioned stoppers and to deliver the same into said chute, a vertical shaft arranged in said column and on the upper end of which said disk is fixed, and driving means.

71. A stopper feed mechanism for bottle stoppering machines comprising a stopper positioning or selecting device embodying magnetic selecting means to pick up and carry stoppers by their metallic portions only and stopper discharge and positioning mechanism arranged to receive the stoppers from said means and maintain the proper position thereof, said mechanism comprising stopper guiding means arranging the stoppers in rows.

72. A stopper feed mechanism for bottle stoppering machines comprising a receptacle adapted to receive a promiscuous mass of bottle stoppers having metallic sides and provided with magnetic selecting means adapted by magnetism to pick up and carry only such stoppers as are arranged in a certain position, and stopper positioning and discharge mechanism for removing the stoppers from said means and discharging the same comprising guiding means for maintaining the stoppers in uniform position.

73. A bottle stopper sorting mechanism comprising movable means adapted to pass into contact with a mass of promiscuously positioned stoppers and to convey from the mass only such stoppers as are in a certain position, and stopper positioning and discharging mechanism arranged to receive the stoppers from said means and discharge the same therefrom while maintaining the stoppers in uniform position, said mechanisms comprising stopper deflectors, and guides and means for periodically stopping the discharge of the stoppers.

74. A bottle stopper feed mechanism comprising a movable member provided with magnetic stopper selecting and conveying means adapted to pass into contact with a mass of promiscuously positioned stoppers and convey from the mass only such stoppers as are arranged in a certain position, and a stopper positioning discharge to receive the stoppers therefrom comprising movable means for periodically retarding the discharge of the stoppers.

75. A bottle stopper feed mechanism comprising a rotary box having an inlet for the promiscuously positioned stoppers, and a stopper gravity discharge chute from the box, said box provided with internal stopper selecting and conveying magnets adapted to deliver properly positioned stoppers and a stopper guide and positioning mechanism adapted to receive stoppers from said magnets and periodically deliver the same to said chute.

76. A stopper feed mechanism comprising a rotary box adapted to receive a mass of promiscuously positioned stoppers, said box being internally formed to pick up and carry over properly positioned stoppers, and a discharge stopper slide way arranged longitudinally within the box into which said properly positioned stoppers are dropped on edge and by which they are delivered from the box, said slideway comprising deflecting guide means and being arranged to maintain the stoppers one behind the other and properly positioned.

77. A stopper feed mechanism comprising a rotary box having magnets arranged around its inner surface, a stopper slideway arranged longitudinally in the box to discharge the stoppers therefrom and provided with means to strip the stoppers from the magnets and maintain the uniform position thereof and guide them into the slideway.

78. A bottle stopper feed mechanism comprising a rotary box having magnets set in the inner surface thereof, the inner surface of the box being formed with annular grooves, and a support arranged within the box and forming a stopper slideway therefrom and provided with strippers extending into said grooves.

79. A bottle stopper feed mechanism comprising a rotary box internally provided with means to elevate the stoppers, a support arranged longitudinally within the box forming a stopper discharge way therefrom and provided with means to discharge the stoppers thereinto, and a tilting platform arranged in said way to receive the stoppers and provided with means for periodically tilting the same to discharge the stoppers therefrom.

80. A stopper feed mechanism comprising fixed end heads, a horizontally disposed rotary box carried thereby, one head having a stopper discharge slit and a discharge chute depending therefrom, a support arranged longitudinally within the box and carried by said heads and formed with a longitudinal stopper slideway extending to said slit, a tilting platform arranged longitudinally in said slideway and normally upheld with its discharge end above said slit, means to tilt said platform periodically to drop its free end so that the stoppers on the platform can pass through said slit, and means to deposit the properly positioned stoppers from the inner surface of said box onto said platform.

81. In a bottle stoppering machine, in combination, bottle sealing devices, a horizontally disposed rotating disk, a stopper discharge way therefrom, a stopper chute arranged above said disk and formed to successively deliver stoppers onto the top surface of said disk with their sealing medium faces in engagement with the disk, and a stopper selecting device adapted to successively deliver properly positioned stoppers into said chute.

82. In combination, a horizontally disposed rotary stopper moving and delivering disk adapted to receive stoppers on its top face, means for rotating said disk to move the stoppers on its top face and feed the same therefrom, stopper directing means to receive and direct the stoppers from said disk, a stopper supply chute leading to said disk, and stopper sorting and positioning means adapted to discharge uniformly and properly positioned stoppers to said chute for delivery in proper position onto the face of said disk.

83. In combination, a horizontally disposed disk having a stopper moving and delivering top face, means to guide stoppers therefrom and maintain the proper position thereof, means for rotating said disk, and stopper sorting, and positioning means for discharging uniformly and properly positioned stoppers onto said face of the disk, substantially as described.

84. In combination, a horizontally disposed disk having a plane top stopper-moving and delivering surface on which the stoppers are adapted to rest and be moved by frictional engagement with said surface, means for constantly rotating said disk, and means for guiding stoppers therefrom and maintaining the desired uniform position thereof, substantially as described.

85. In combination, bottle stoppering mechanism, a horizontally disposed rotary disk having a top stopper-receiving and moving friction-surface adapted to receive uniformly positioned stoppers and move the same by frictional contact therewith, and means for guiding stoppers therefrom, and maintaining the uniform position thereof, to said stoppering mechanism, said means forming a row of contacting stoppers moved forward by engagement with stoppers on and frictionally engaging said rotating disk.

86. Stopper selecting and positioning mechanism comprising means to arrange uniformly positioned stoppers on edge and in rows, a stopper discharge guide chute adapted to deliver said stoppers horizontally and uniformly face down, and means to periodically deliver said stoppers while on edge to said chute.

In testimony whereof I affix my signature, in presence of two witnesses.

WILLIAM SAMUEL DORMAN.

Witnesses:
S. F. McKenly,
R. A. Canfield.